United States Patent [19]

Overman et al.

[11] 4,146,892

[45] Mar. 27, 1979

[54] ADAPTIVE RADAR THREAT DETECTION AND TRACKER VERIFICATION SYSTEM

[75] Inventors: Thelma L. Overman; Kelly C. Overman, both of Millers, Md.

[73] Assignee: Westinghouse Electric Corp., Pittsburgh, Pa.

[21] Appl. No.: 757,402

[22] Filed: Jan. 6, 1977

[51] Int. Cl.² ............................................. G01S 7/36
[52] U.S. Cl. ................................ 343/18 E; 343/5 SA
[58] Field of Search ........................... 343/5 SA, 18 E

[56] References Cited

U.S. PATENT DOCUMENTS

| | | | |
|---|---|---|---|
| 3,714,654 | 1/1973 | Wicks et al. | 343/18 E |
| 3,716,853 | 2/1973 | La Follette | 343/18 E X |
| 3,922,676 | 11/1975 | O'Berry et al. | 343/18 E X |
| 4,025,920 | 5/1977 | Reitboeck et al. | 343/18 E X |

Primary Examiner—T. H. Tubbesing
Attorney, Agent, or Firm—H. W. Patterson

[57] ABSTRACT

A system for detecting threats with respect to stored beams that have been established as characteristic of the beams of the signal emitters associated with a particular threat, and for adaptively redefining the stored beam parameters of signal emitters associated with a particular threat in response to the parameters of beams detected by the adaptive tracking system. A radar system for tracking a signal wherein the radar system periodically verifies that tracking has not been transferred from the original signal to a second signal having similar parameters.

4 Claims, 19 Drawing Figures

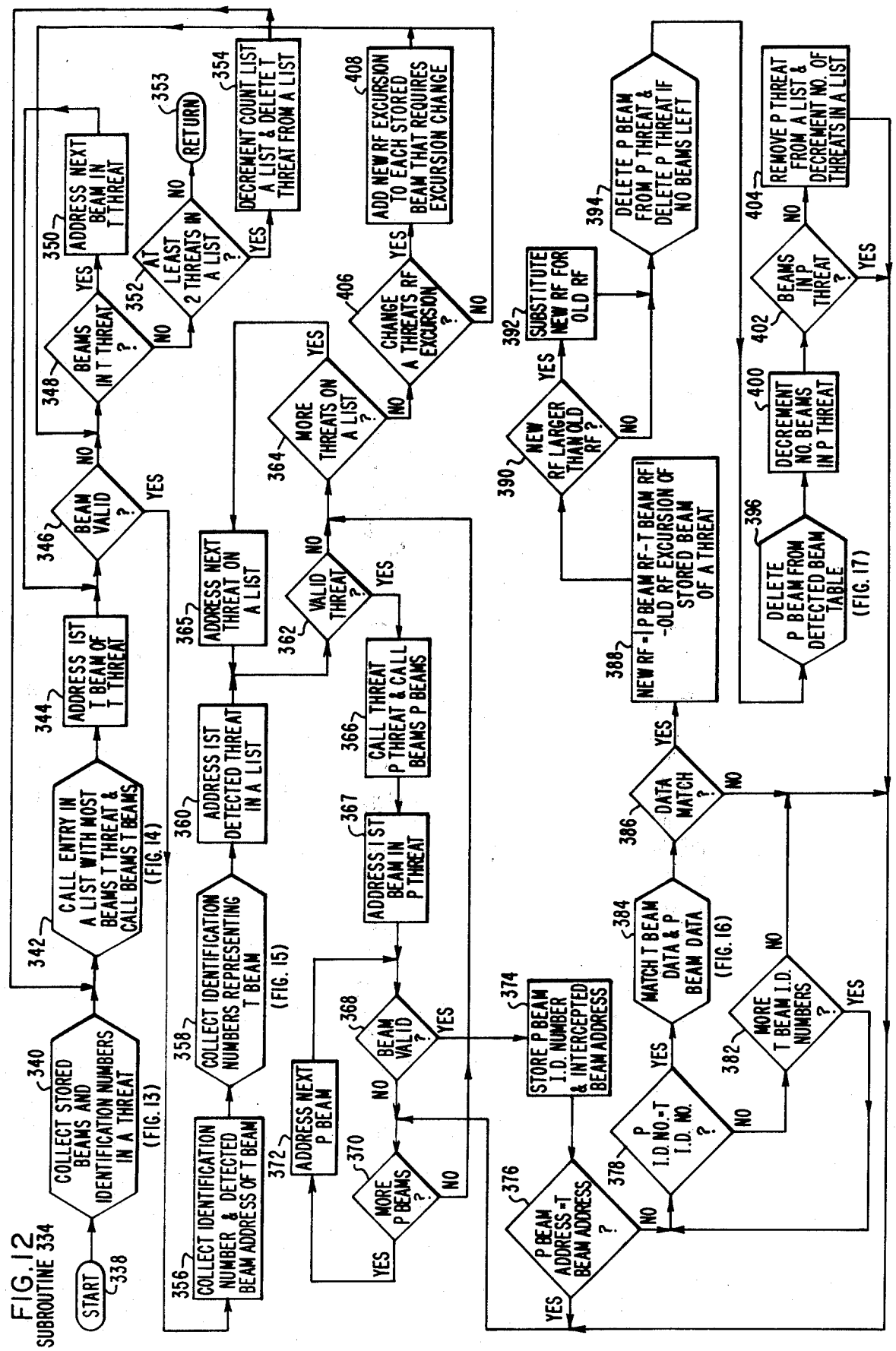

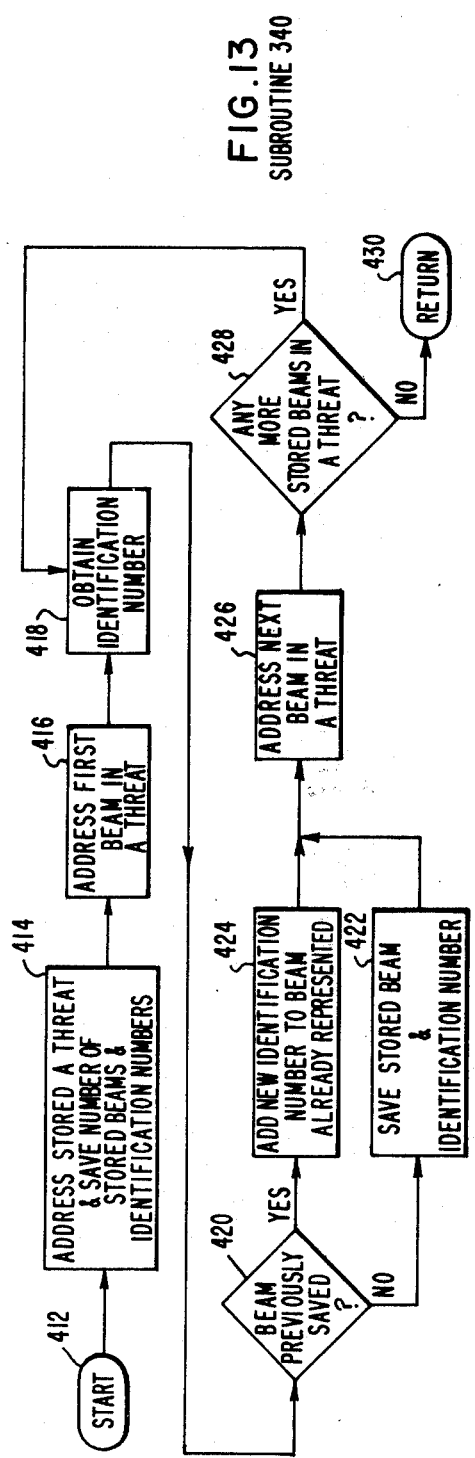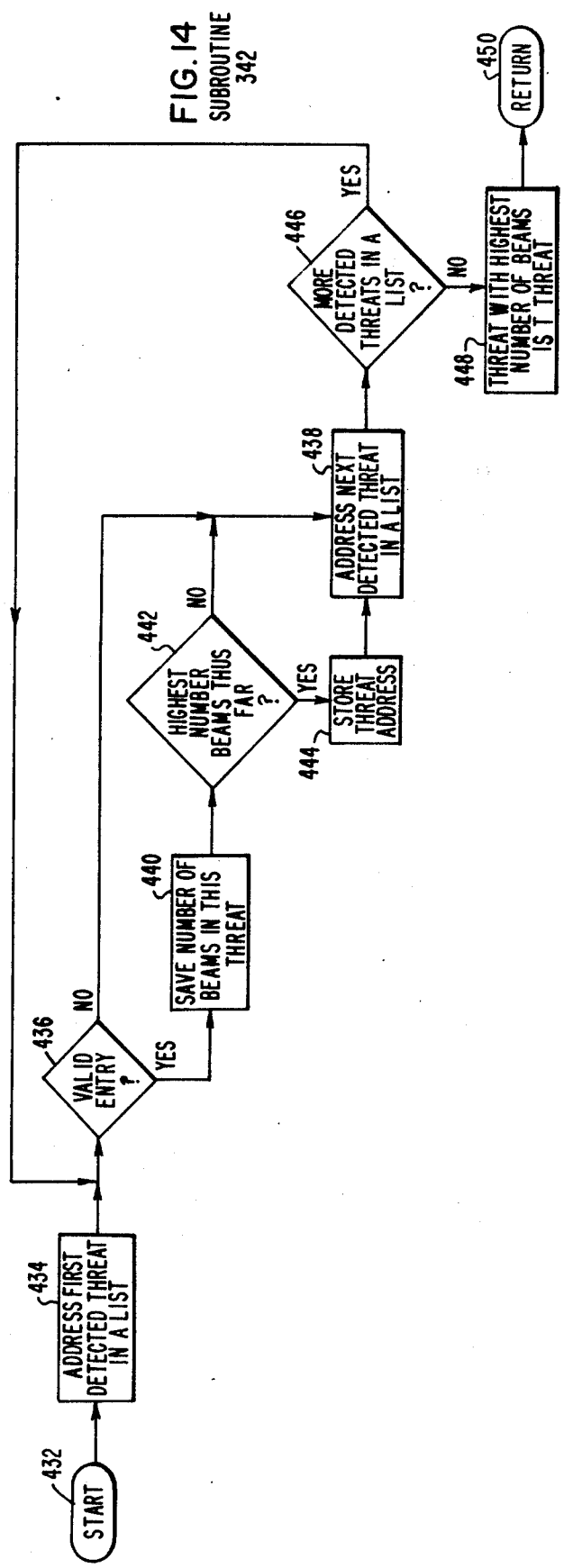

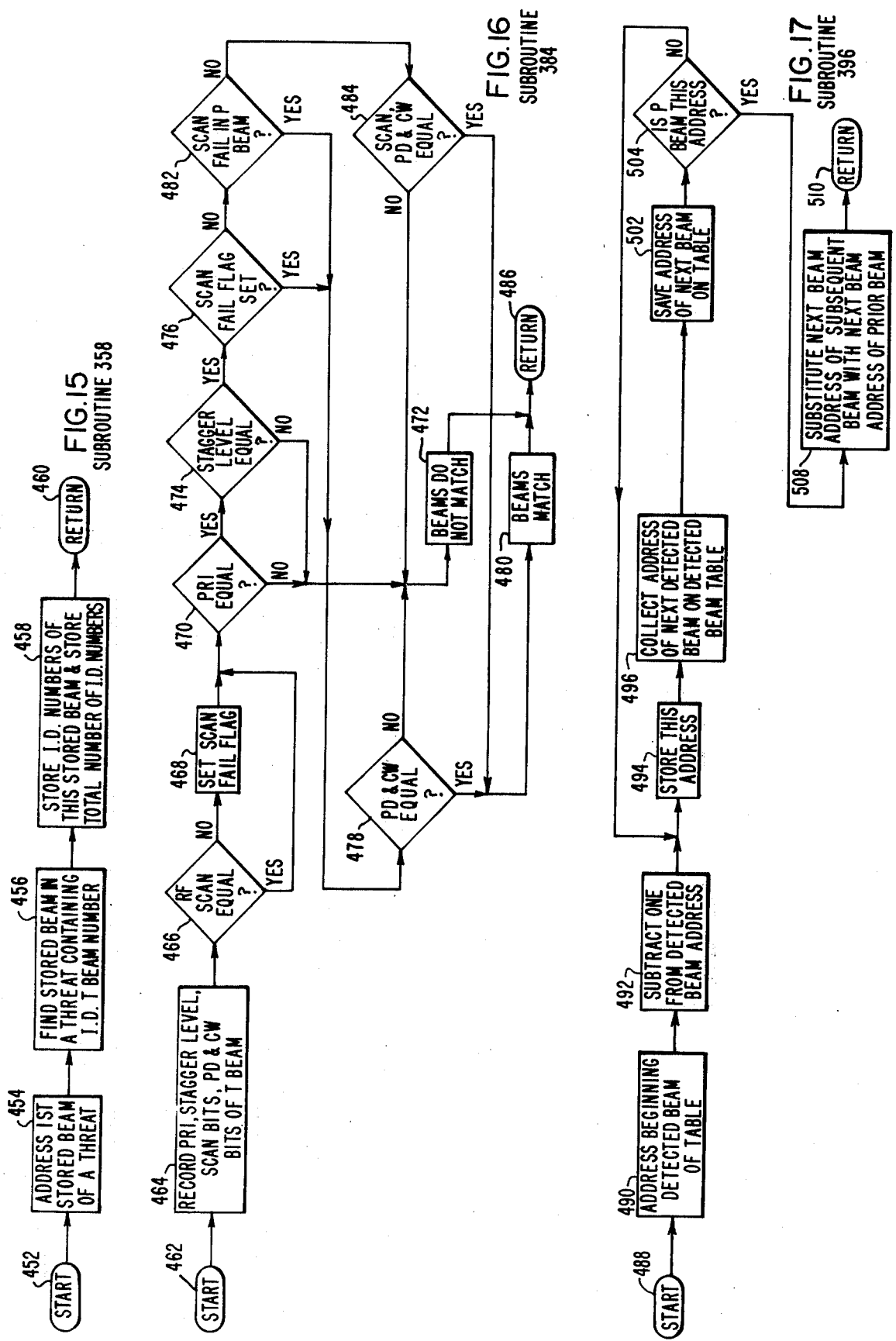

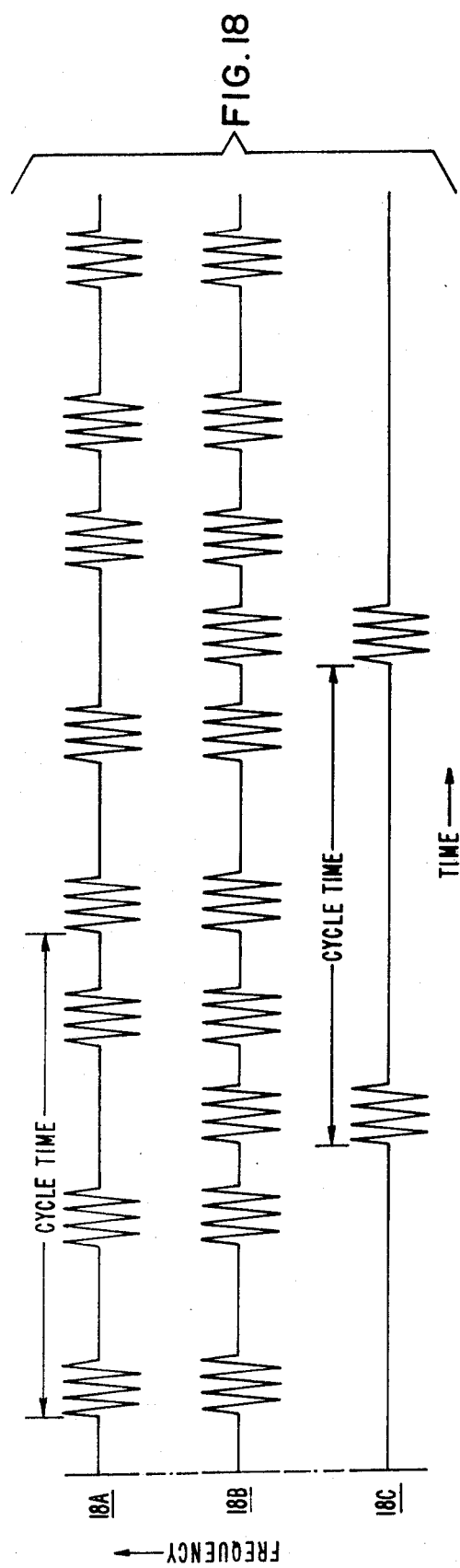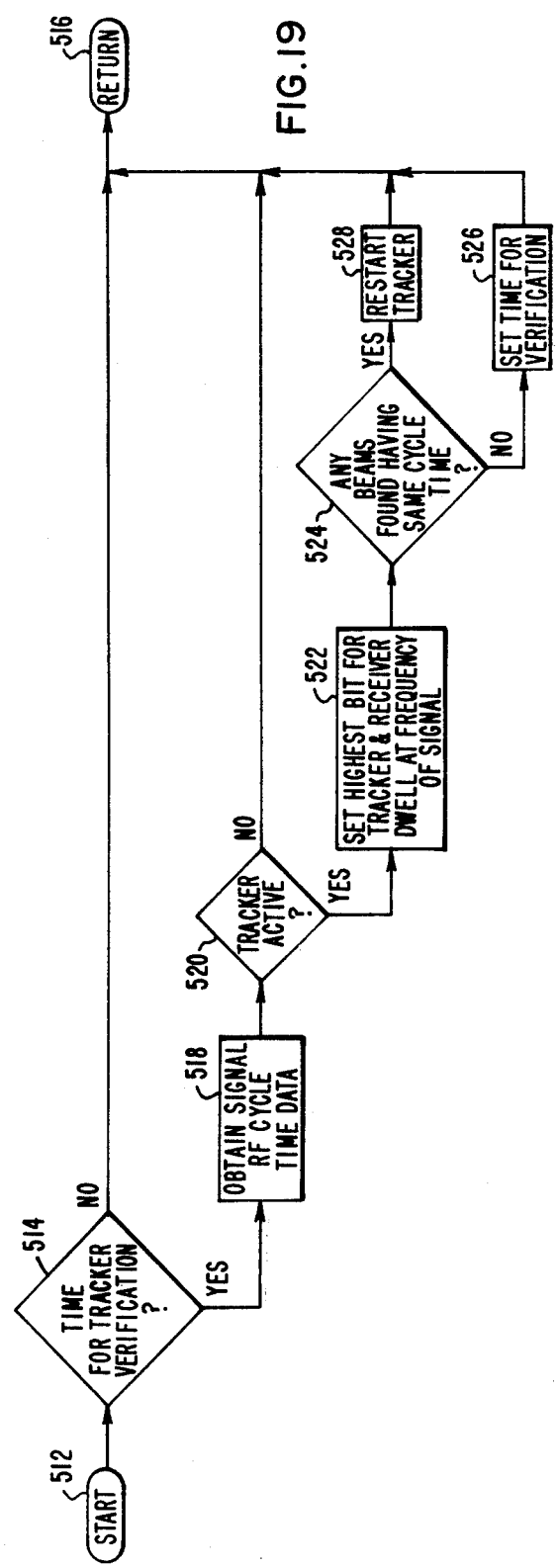

ADAPTIVE RADAR THREAT DETECTION AND TRACKER VERIFICATION SYSTEM

BACKGROUND OF THE INVENTION

1. Field of the Invention

The present invention relates to radar systems for detecting threats in accordance with stored beam parameters of signal emitters associated with the threats and, more particularly, to a radar system for detecting threats in accordance with adaptively redefined stored beam parameters associated with the threats. In other aspects the present invention relates to radar systems for tracking signals, and more particularly, to radar systems which verify that tracking has not been transferred to a second signal having parameters which are similar to the original signal.

2. Description of the Prior Art

As is known in the radar art, devices which employ active radar systems necessarily contain signal emitters whose emitted signals, commonly known as beams and so referred to herein, may be used to identify the device after the characteristic parameters of the emitted signals, or beams, have been established and associated with the device. That is, devices which employ active radar systems contain at least one signal emitter which can be used to identify the device after the characteristic beam parameters for the emitter are determined and have been associated with the particular device. In the military sciences, devices which employ active radar systems include offensive and defensive weapons as well as their delivery vehicles. Although such weapons and their delivery vehicles are often used in a defensive posture, the presence of a weapon or a delivery vehicle is considered to be a threat to the successful mission and/or survival of the opposing military force so that all such military devices employing active radar systems are, quite properly, designated as threats by the opposing force. Therefore, according to the general experience of the radar art as applied to use in the military sciences, it is well known in the prior art that military threats containing active radar systems may be detected in accordance with at least one beam which has a known association with the threat.

In the prior art, threat detection systems have detected threats by detecting the presence of beams which have characteristic parameters and comparing these detected beams to stored beams having similar characteristic parameters and which are known to be associated in various combinations with particular threats. The associations of the stored beams with a particular threat are cataloged as a stored threat so that when the comparison of the detected beams and the stored beams indicates the presence of one or more detected beams substantially similar to one or more stored beams that are cataloged as a stored threat the threat detection system indicates the presence of a detected threat. Although these prior art systems are adequate to detect threats whose actual beam parameters correspond to the stored beam parameters associated with the threat, the prior art systems are unable to adaptively redefine their stored beam parameters in response to detected beams which exhibit parameters that are different than those of the stored beams previously associated with the threat. Therefore, it has been possible for a threat to confuse prior art threat detection systems, or to avoid detection altogether by causing the emitters of its radar system to exhibit beam parameters deviating from the predetermined, or stored, beam parameters previously associated with the and cataloged as a stored threat. Although some prior art threat detection systems afford the flexibility that their stored beam parameters and stored threat signals may be altered so that their stored beams may be redefined and associated with new stored threats once the deviations of the actual beam parameters and their respective threat associations have become known, it remains for some external intelligence gathering operation to ascertain the appropriate stored beam parameters and associate these different stored beams with the appropriate stored threats. For any radar system which detects devices employing active radars, the time necessary to perform this intelligence gathering operation is inconvenient and, for threat detection systems engaged in military conflicts, this delay could be fatal to the success of the mission. Moreover, it is unlikely that every combination of actual beam parameters for each particular threat that will be encountered will be available as a stored beam parameter of a stored threat. Therefore, there was a need in prior art threat detection systems for a capability to adaptively redefine the parameters of stored beams which are associated with a particular stored threat, and adapt the system's stored threats in accordance therewith.

Prior art radar systems have been developed for tracking the incidence of threat signals upon an antenna that is sensitive to microwave energy. Some of these systems are capable of detecting a situation in which the radar system has lost track of a threat signal. However, for the situation in which a second signal having similar paramters is substituted for the signal which was originally being tracked, these prior art radar sytems could confuse the second signal with the original signal and begin to track the second signal as though it were the original. There was, therefore, a need for a radar system which would not only track signals but would also be able to detect a situation in which a signal having parameters similar to the parameters of the originally tracked signal had been substituted for the original signal in the course of operation of the radar system.

SUMMARY OF THE INVENTION

In accordance with the presently disclosed apparatus for detecting threats which are associated with at least one beam having parameters which are controllably varied, a receiver detects beams having selected parameters of predetermined values. These detected beams are provided to a central processing unit in which they are compared with parameters of stored beams to detect a particular threat in accordance with the known association of the stored beams with that threat. When the comparison of the selected parameters of the detected beams with the stored beam parameters indicates the prsence of a predetermined number of detected threats and the detected beams associated with the different detected threats differ in a selected number of parameters but are otherwise identical, the radar system determines that the threat is actively varying those parameters of the detected beams and expands the respective parameters of the corresponding stored beams, thereby limiting threat detection errors due to the active variation of the detected beam parameters by the threat.

In accordance with the present invention, a radar system includes a receiver for detecting signals, a tracker for predicting the occurrence of the signals detected by the receiver, and a central processing unit which cooperates with the receiver and the tracker to verify that the radar system has continuously maintained track of a particular signal over its course of operation.

BRIEF DESCRIPTION OF THE DRAWINGS

FIG. 12 is a flow chart describing the operation of the central processing unit in making an investigation of the detected beams associated with detected threats corresponding to a single stored threat to determine if the radio frequency excursion of any of the stored beams of the stored threat can be redefined to more nearly match the radio frequency excursion of the detected beams.

FIG. 13 is a flow chart illustrating the operation of the central processing unit in making a list of the various stored beams that are associated with a particular stored threat.

FIG. 14 is a flow chart illustrating the operation of determining the detected threat associated with the highest number of detected beams.

FIG. 15 is a flow chart describing the compilation of the identification numbers of the detected threat having the highest number of detected beams.

FIG. 16 is a flow chart which describes the comparison of the detected beams of the detected threat having the most beams with the detected beams of the other detected threats.

FIG. 17 is a flow chart illustrating the deletion of a detected beam of a detected threat from the detected threats which correspond to a single stored threat in accordance with FIG. 12.

FIG. 18 shows typical waveforms which illustrate a typical example for which the present invention determines whether the radar system has continuously maintained track of a particular signal.

FIG. 19 is a flow chart describing the operaion of the central processing unit in determining whether the radar system has continuously maintained track of a particular signal.

DESCRIPTION OF THE PREFERRED EMBODIMENT

As was explained previously, threat detectors of the prior art detected threats by comparing certain parameters of detected beams with stored beam parameters that were previously known to be associated with particular threats. However, in the prior art, threats could confuse or avoid detection by these threat detectors by actively varying the parameters of their beams. This was because the prior art threat detectors were unable to adaptively redefine their stored beam parameters in response to variations in the parameters of detected beams when such variations indicated that the detected beam parameters were being actively controlled by the threat. In contrast to this, the preferred embodiment of the present invention maintains the detection of a threat by adaptively redefining stored beam parameters in accordance with variations in the parameters of detected beams when such variations are indicative of the active control of those parameters by the threat.

Figure 1:
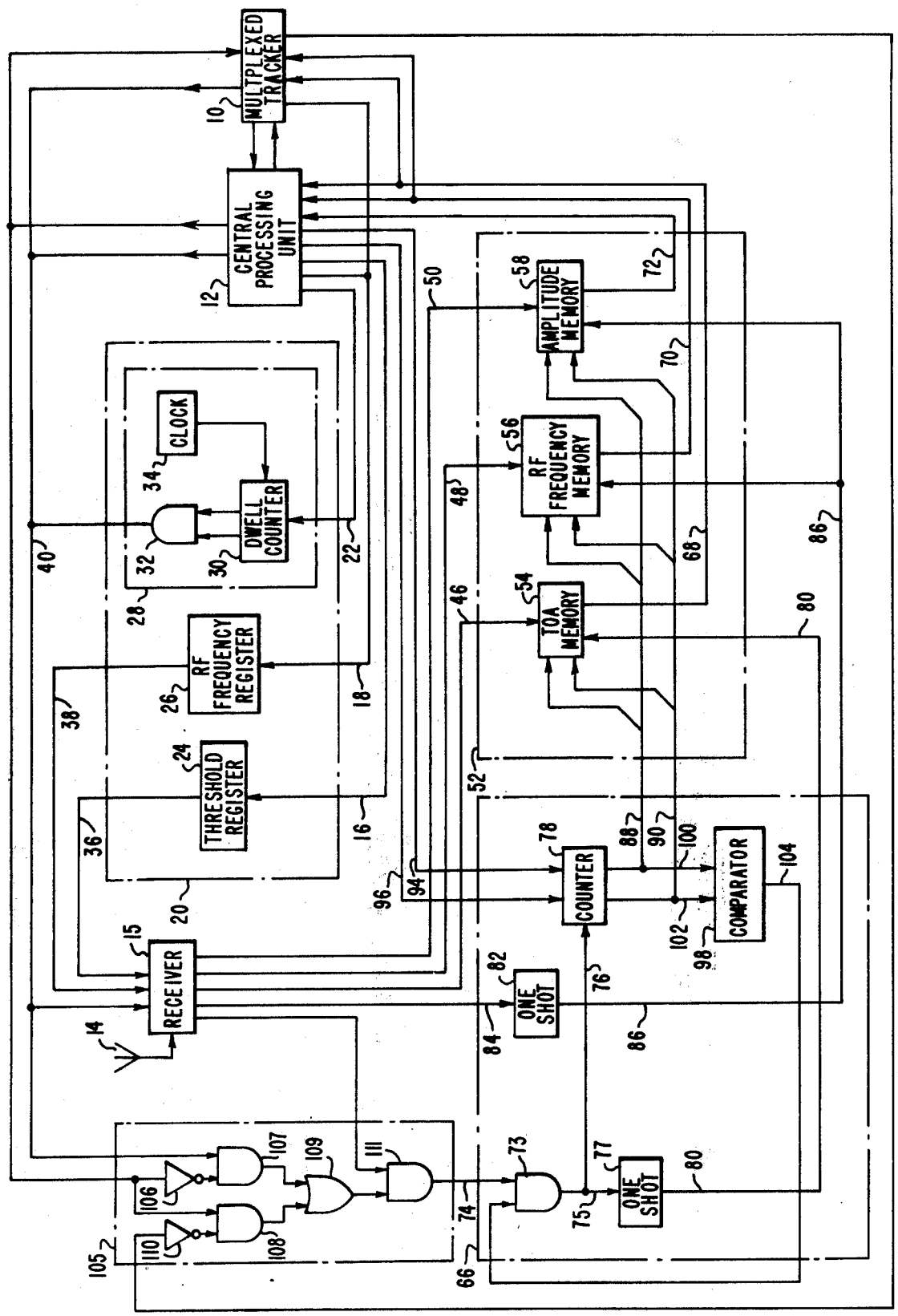
FIG. 1 is a block diagram showing the apparatus employed in the preferred embodiment of the present invention.

The preferred embodiment of the disclosed apparatus for detecting a threat which actively varies the parameters of its beams is described in relation to FIG. 1. In the operation of the disclosed apparatus, a processing device which, in the example of the preferred embodiment, is a multiplexed tracker 10 which is further described in relation to FIGS. 3–7, but which could equivalently be a signal intercept system as well known to those skilled in the pertinent art, cooperates with a central processing unit 12 to predict the incidence of a threat signal on an antenna 14 which is coupled to a receiver 15. The threat signal is comprised of phase coherent beams whose parameters are characteristic of the threat. Initially, predetermined parameters of beams are stored in the central processing unit 12 with these predetermined parameters hereafter referred to as stored beams. The associations of these stored beams with various particular threats in accordance with predetermined information is also stored in the memory of the central processing unit 12, with the association of one or more of those stored beams with a threat hereafter referred to as a stored threat. The central processing unit 12 may be comprised of a general purpose digital computer such as the Westinghouse Millicomputer CP-1138 which has been in public use for more than one year and which is more fully described in a publication entitled "CP-1138 Millicomputer", copyright 1972 by Westinghouse Electric Corporation, and published by Westinghouse Electric Corporation, Defense and Electronic Systems Center, Systems Development Division, Baltimore, Maryland. According to the operation of the disclosed apparatus, the central processing unit 12 provides the information of the stored threats and their respective stored beams to the receiver 15 through the receiver control 20. Specifically the central processing unit 12 causes the receiver 15 to detect beams having parameters substantially similar to the parameters of the stored beams by providing signals in lines 16, 18 and 22 to a receiver control 20. The signals provided to the receiver control 20 substantially correspond to the radio frequency (hereafter referred to as RF) and amplitude parameters of the stored beams. The receiver control 20 includes a threshold register 24 and a radio frequency register (hereafter referred to as RF register) 26 and an enable signal generator 28 which includes a dwell counter 30, an AND gate 32 and a clock 34. The threshold register 24 and the RF register 26 respectively operate in response to the signals provided by the central processing unit 12 on lines 16 and 18 to provide an amplitude threshold control signal on line 36 and an RF control signal on line 38 to the receiver 15. The enable signal generator 28 provides an enable signal on line 40 to the receiver 15 in response to the timing signal provided by the processing unit 12 on line 22 to the dwell counter 30. This timing signal establishes a value in the dwell counter 30 which is counted down by the rate at which pulses are provided from the clock 34 to the dwell counter 30. The dwell counter 30 provides an output signal to the AND gate 32 such that the AND gate 32 provides an enable signal on line 40 to the receiver 15 as long as the value of the dwell counter 30 is positive. Therefore, if the clock 34 operates at a fixed rate, the duration of the enable signal on line 40 will be determined by the magnitude of the value established by the timing signal provided to the dwell counter 30 by the central processing unit 12.

The antenna 14 collects microwave or radio frequency (RF) signals which are propagating in a line which coincides with the antenna position and provides these signals to the receiver 15. In response to the control signals provided to the receiver control 20, the receiver 15 detects signals that are collected by the antenna 14 which substantially correspond to the RF frequency control signal on line 38 and to the amplitude threshold control signal on line 36. The receiver 15 may be comprised of any such well-known device which, for example, may be a Varian receiver, Part No. VZZ-3017 or, alternatively, Varian receiver, Part. No. VZX-3017.

Figure 2:
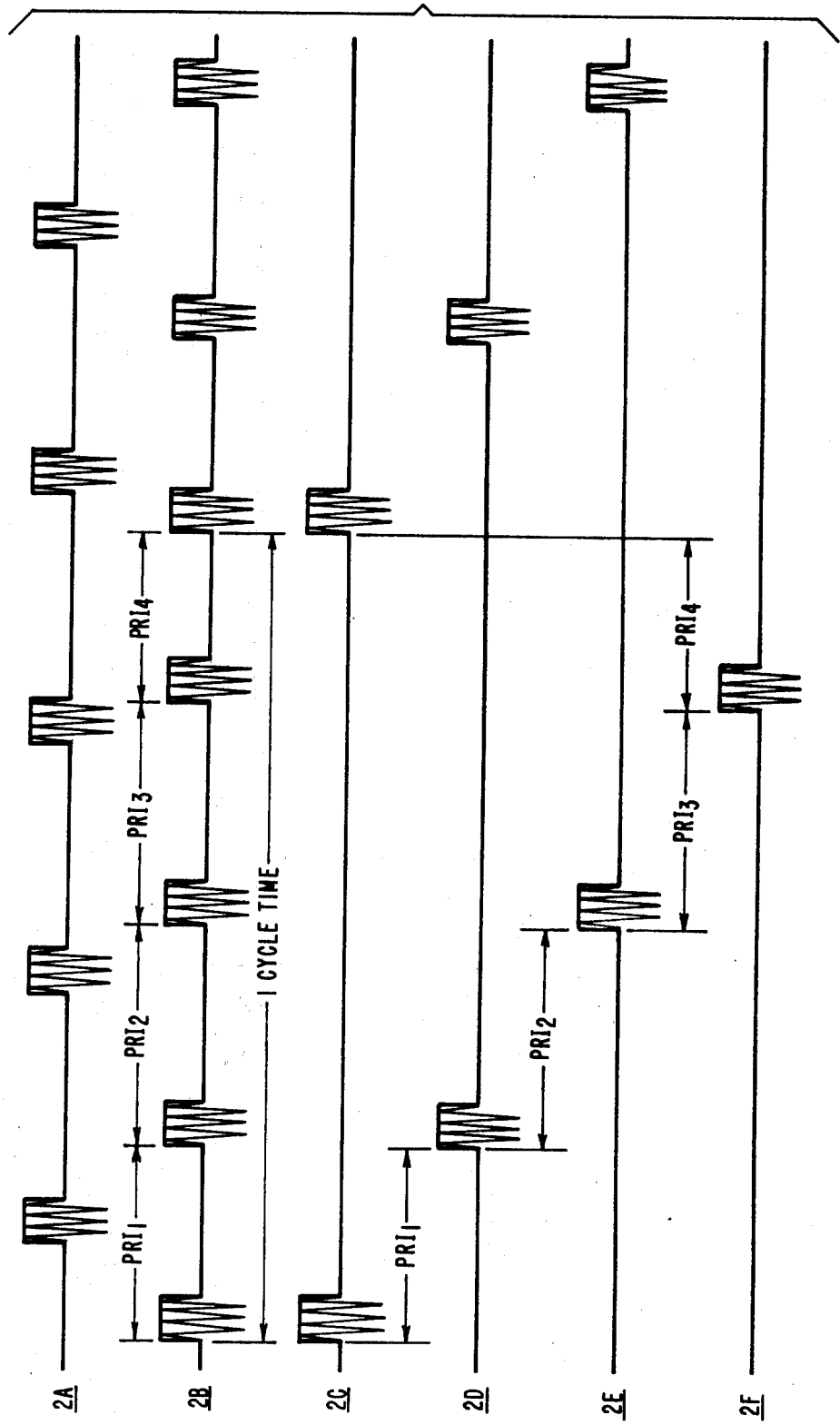
FIG. 2 illustrates the waveforms of two threat signals which have single and multiple beams respectively, and also shows various parameters of the threat signals.

Typical signals which are detected by the receiver 15 are illustrated in waveforms 2A and 2B of FIG. 2. The time of arrival (TOA), radio frequency (RF), and amplitude of the pulses of signals detected by the receiver 15 are respectively provided on lines 46, 48 and 50 to a buffer memory 52 which is comprised of a time of arrival memory (TOA memory) 54, a radio frequency memory (RF memory) 56, and an amplitude memory 58. For each pulse detected by the receiver 15, the TOA memory 54 stores the time of arrival (TOA) of the pulse, the RF memory 56 stores the RF of the signal whose envelope determines the pulse, and the amplitude memory 58 records the amplitude of each detected pulse in response to address and write signals provided by a buffer memory control 66.

The buffer memory control 66 provides the appropriate address and write signals to the buffer memory 52 to provide for the storage of the information detected by the receiver 15 in the TOA memory 54, the RF memory 56 and the amplitude memory 58. The buffer memory control 66 also provides the appropriate address and read signals to provide for the delivery of the pulse information stored in the buffer memory 52 to the central processing unit 12. The buffer memory control 66 may be comprised of any suitable combination of logic elements which perform the above-described functions as is well known to those skilled in the pertinent art. The example of the preferred embodiment of FIG. 1 includes an AND gate 73 which is responsive to a TOA receiver strobe signal on line 74 and which supplies an enable signal on lines 75 and 76 to a one-shot generator 77 and a counter 78 respectively. The one-shot generator 77 provides a TOA write signal on line 80 and a second one-shot generator 82, which is responsive to a receiver conversion signal on line 84, provides an amplitude and an RF write signal on line 86. The counter 78 provides the TOA, RF and amplitude memory address signals on lines 88 and 90 in response to an enable signal from the AND gate 73 on line 76, or in response to the combination of read and address signals on lines 94 and 96 respectively from the processing unit 12. The address signals of the counter 78 are also provided to a comparator 98 on lines 100 and 102. The comparator 98 is hard wired to provide a maximum count signal on line 104 to the AND gate 73 unless the comparator 98 determines that the capacity of the buffer memory 52 has been exceeded.

In the operation of the buffer memory control 66 to store signals detected by the receiver 15 in the buffer memory 52, the AND gate 73 receives the TOA receiver strobe signal on line 74 which is provided by the receiver 15 whenever a pulse is detected by the receiver provided a verify command network 105 is conductive. If the maximum count signal is simultaneously present on line 104 when the receiver strobe signal is received, the AND gate 73 provides an enable signal to the counter 78 which provides a pulse address on lines 88 and 90 to the TOA memory 54, the RF frequency memory 56, and the amplitude memory 58. At the same time, the AND gate 73 provides an enable signal to the one-shot generator 77 which, as well known in the art, provides a short TOA write pulse on line 80 in response to an increase in the amplitude level of the signal on line 75 to permit the receiver 15 to write the time of arrival (TOA) of the detected pulse into the TOA memory 54 at the address designated by the counter 78. If the receiver 15 determines that the detected pulse which arrived at the receiver 15 at one-shot no 75 the time stored at the address of the TOA memory 54 contained the requisite RF and amplitude called for by the amplitude and RF control signal on lines 36 and 38 respectively, the receiver 15 provides a receiver conversion on line signal to the one-shot generator 82 on line 84. In a manner similar to the one-shoot generator 77, the one-shot generator 82 provides an RF and amplitude write pulse on line 86 in response to an increase in the amplitude level of the signal on line 84 to permit the receiver 15 to write the RF and amplitude of the detected signal pulse into the RF memory 56 and the amplitude memory 58 respectively at addresses determined by the counter 78 and corresponding to the address at which the TOA of the pulse was stored in the TOA memory 54. The comparator 98 is hard wired such that, when all the addresses of the TOA memory 54 have been filled, the maximum count signal is not longer provided on line 104. Without the presence of the maximum count signal on line 104, the AND gate 73 no longer provides an enable signal on line 75, or 76 and, therefore, no more TOA's are stored in the memory buffer 52. The maximum count signal provided on line 104 is extinguished so that the receiver 15 cannot write over received signal pulse parameters which have already been stored in the memory buffer 52 thereby resulting in unreliable received signal pulse data.

When the receiver 15 detects the TOA of a detected signal pulse but the detected pulse does not have the requisite RF and amplitude required by the threshold and RF control signals on lines 36 and 38, the one-shot generator 82 receives no receiver conversion signal on line 84 corresponding to the TOA receiver strobe signal on line 74 so that no RF and amplitude write pulse is generated by the one-shot generator 82. Therefore, no RF or amplitude information corresponding to the detected pulse is stored in the RF memory 56 or the amplitude memory 58 at the address corresponding to the address of the TOA memory 54 at which the TOA of that pulse is stored. Subsequently, when the central processing unit 12 addresses the TOA memory 54 to obtain this TOA value, it is also given the information that no suitable RF or amplitude information corresponding to this TOA was obtained by the receiver 15.

The central processing unit 12 obtains the TOA, RF and amplitude of the detected signals from the buffer memory 52 by providing a read signal on line 94 and an address signal on line 96 to the counter 78. The read and address signals from the central processing unit 12 cause the counter 78 to provide address and read signals on lines 88 and 90 which cause the TOA memory 54, the RF memory 56 and the amplitude memory 58 to provide the TOA, RF and amplitude of the particular detected signal pulse which is addressed on lines 68, 70 and 72 respectively. The receiver control 20, the receiver 15, the buffer memory 52, and the buffer memory control 66 thus far described in relation to FIG. 1 thus provide a means for detecting signals having selected TOA, RF and amplitude parameters that are within a predetermined range of values.

The detected signals which are detected by the receiver 15 and delivered through the memory buffer 52 to the central processing unit are sorted into detected threat signals comprised of phase coherent detected beams by comparison of the detected signals with the stored threats and stored beams in accordance with conventional threat signal acquistion techniques. These detected threat signals and detected beams may be established by any of several well-known signal acquisition methods such as appropriately programming the central processing unit 12 with a sort routine. In general the TOA, RF and amplitude for each pulse of a detected signal, as stored is the buffer memory 52, is made available on lines 68, 70 and 72 to the central processing unit 12 which compares selected parameters of the signals detected by the receiver 15 and stored in the buffer memory 52 with the parameters of the stored beams which are considered to be exhibited by particular threats based on predetermined information to establish detected beams from the detected signals. The central processing unit 12 then detects threats by associating these detected beams with the stored threats that catalog the stored beams corresponding to the detected beams. Accordingly, the central processing unit 12 provides a means for detecting threat signals from the signals detected by the receiver 15 by comparing the detected signals with stored beams that are associated with stored threats to detect beams transmitted by the threat, and by detecting threat signals comprised of the detected beams where said detected threat signals correspond to the stored threat signals associated with the stored beams that are comparable to the detected beams.

The detected threat signals of phase coherent detected beams are provided by the central processing unit 12 to the multiplexed tracker 10 whbich is hereafter more fully described in relation to FIGS. 3 through 7. The multiplexed tracker 10 tracks the detected threat signals by making predictions as to the RF and PRI of the detected threat signals and providing an RF control signal to the receiver control 20 on line 18 and a window signal on line 40 to cause the receiver 15 to detect this threat signal as it is collected by the antenna 14. The TOA and RF of signals detected by the receiver 15 in response to the control signal are provided to the multiplexed tracker 10 which then corrects errors in its predictions as hereafter more fully explained in relation to FIGS. 3 through 9.

As previously stated, threats are detected by comparing the detected beams with stored beams that are considered to be associated with specific threats, the associations of the stored beams being cataloged as stored threats. Periodically, the central processing unit 12 examines the detected beams to determine whether the detected beams indicate that the threat is actively varying selected parameters of the detected beams as is more particularly described in relation to the flow charts shown in FIGS. 11 through 17. The central processing unit 12, as appropriately programmed in accordance with FIGS. 11 through 17 provides a means for comparing detected threats having detected beams with at least one selected parameter to determine a range of values for the selected parameter of said detected beams, and comparing the range of values for the selected parameter of said detected beams with the range of values for the selected parameter of said stored beams corresponding to said detected beams to determine whether the range of values for the selected parameter of said stored beams should be adaptively redefined in accordance with the ranges of values of the detected beams of said detected threats. If redefinition of the parameter of the detected beams is indicated from the comparison made by the central processing unit 12 between the ranges of the detected beams and the ranges of the stored beams, the central processing unit appropriately redefines the limits of the range of the parameters of the stored beams so that detected beams are thereafter detected from signals provided to the central processing unit 12 from the detecting means in relation to these redefined stored beams, consequently eliminating the redundant indication of threats due to the variation of the detected beams parameters by the threat. The detected threat signals that are detected in accordance with the adaptively redefined stored beams are provided to the multiplexed tracker 10 which predicts the further incidence of the detected threats. The multiplexed tracker 10 therefore provides a means for controlling the detecting means in response to the detected threat signals of the comparing means to cause the detecting means to detect threat signals in accordance with the adaptively redefined stored beams of the comparing means.

As was previously explained, the strobe signal of the receiver 15 is transmitted to the buffer memory control 66 to cause the storage of detected beam pulses in the buffer memory 52 in accordance with the foregoing description, provided the verify command network 105 is conductive. As shown in FIG. 1, the verify command network 105 includes an inverter 106, an AND gate 107, an AND gate 108, an OR gate 109, an inverter 110 and an AND gate 111. The inverter 106 is responsive to a verify command signal of the control processing unit 12 which, as explained more particularly in relation to FIGS. 18 and 19, provides the verify command signal when the disclosed tracking system verifies that tracking has been maintained on a particular threat signal. The AND gate 107 is responsive to the output of the inverter 106 and to the enable signal generator 28. The AND gate 108 is responsive to the verify command signal provided by central processing unit 12, and is also responsive to an inverter 110 which is responsive to a tracker prediction signal provided by the multiplexed tracker 10. The OR gate 109 is responsive to the outputs of the AND gates 107 and 108 and the AND gate 111 is responsive to the output of the OR gate 109 and the strobe signal of the receiver 15. The verify command network 105 will be conductive to the strobe signals of the receiver 15 whenever a signal is applied to the AND gate 111 from the OR gate 109. However, no signal will be applied to the AND gate 111 from the OR gate 109 unless the OR gate 109 receives an output signal either from the AND gate 107 or from the AND gate 108. The AND gate 107, which s responsive to the inverter 106, provides an output to the OR gate 109 whenever there is no verify command signal provided to the inverter 106 and there is an enable signal provided on line 40. The AND gate 108 provides an output to the OR gate 109 whenever there is a verify command signal from the central processing unit 12 and there is no tracker prediction signal provided by the multiplexed tracker 10. Therefore, the conduction of the strobe signal from the receiver 15 to the buffer memory control 66 is dependent upon the presence of the enable signal on line 40 in combination with the absence of a verify command signal from the central processing unit 12, or the presence of a verify command signal in combination with the absence of a tracker prediction signal from the multiplexed tracker 10.

In the regular operation of the disclosed tracker system, the central processing unit 12 operates on the premise that the multiplexed tracker 10 has continuously maintained track of a particular threat signal. Therefore, in the regular operation of the disclosed tracker system, no verify command signal will be provided by the central processing unit 12 to verify that the multiplexed tracker 10 has continuously maintained track of the same threat signal. When there is no verify command signal provided to the AND gate 108, the AND gate 108 will be non-conductive. In this normal mode of operation, therefore, the verify command network 105 will be non-conductive to the strobe signal of the receiver 15 unless the AND gate 107 is conductive. When no verify command signal is provided by the central processing unit 12, no signal is provided to the inverter 106 and the inverter provides a signal to the AND gate 107. The AND gate 107 then provides an output to the OR gate 109 whenever the enable signal is present on line 40. In response to an output from the AND gate 107, the OR gate 109 provides an output to the AND gate 111 which then provides an output to the buffer memory control 66 in response to a strobe signal from the receiver 15. Accordingly, whenever there is an enable signal in combination with the absence of a verify command signal, the verify command network 105 provides an output to the buffer memory control 66 in response to a strobe signal from the receiver 15, or, equivalently, the verify command network 105 is conductive to the strobe signal of the receiver 15.

When the central processing unit 12 determines that a verification should be performed as to whether the multiplexed tracker 10 has continuously maintained track of a particular threat signal, the central processing unit 12 provides a verify command signal to the inverter 106 so that no output is provided from the inverter 106 to the AND gate 107. Therefore, the verify command network 105 will be conductive to the strobe signals of the receiver 15 only if the verify command signal is provided to the AND gate 108 in combination with the absence of a tracker prediction signal from the multiplexed tracker 10. As will be explained more specifically in relation to FIGS. 3 and 5, the multiplexed tracker 10 will provide a tracker prediction signal to the AND gate 108 coincident with a verify command signal from the central processing unit 12 in combination with the prediction of a pulse in the threat signal by the multiplexed tracker 10. When the verify command signal is provided to the AND gate 108 in the absence of a tracker prediction signal from the multiplexed tracker 10 to the inverter 110, the AND gate 108 provides an output to the OR gate 109. In response to an output from the AND gate 108, the OR gate 109 provides an output to the AND gate 111 so that the AND gate 111 provides an output to the buffer memory control 66 in response to a strobe signal from the receiver 15. Equivalently, it can be said that the verify command network 105 is made conductive to the strobe signal of the receiver 15 in response to the verify command signal from the central processing unit 12 in the absence of a prediction signal from the multiplexed tracker 10.

Waveforms 2A and 2B of FIG. 2 illustrate two waveforms which may be considered to comprise typical examples of threat signals, each of which are known to be characteristic of a particular threat. Waveform 2A is comprised of the envelope of a radio frequency (RF) signal which has RF excursions at periodic intervals such that the envelope of the RF signal forms pulses of a predetermined width which occur at predictable times. The elapsed time between correlative points on successive pulses is generally referred to as the pulse repetition interval or PRI. Waveform 2B is also comprised of the envelope of a radio frequency signal (RF signal) which is similar to the waveform 2A with the exception that the pulse repetition interval (PRI) between successive pulses of the waveform is not always the same. However, the pulses of waveform 2B are phase coherent so that the pulse repetition interval (PRI) values between the successive pulses remain the same over the duration of the signal. Moreover, the pattern of the pulses of waveform 2B can be seen to repeat themselves over predetermined intervals which are generally referred to as cycle times. In the particular example of waveform 2B, a cycle time includes four successive, phase coherent pulses of the waveform so that an alternative way of considering waveform 2B is to consider it to be the linear combination of four, phase coherent pulse trains whose pulses are separated by one cycle time and whose phases are staggered by intervals equivalent to the pulse repetition intervals of the waveform 2B. In accordance with this description of the threat signal illustrated as the waveform 2B, the waveform may be referred to as a pulse waveform having four stagger levels or, equivalently, as a threat signal comprised of four beams. Referring to the threat signal illustrated as the waveform 2A, it will now be understood that the threat signal is comprised of a single stagger level, or equivalently, a single beam. The beam parameters which are of particular interest for the example of the preferred embodiment herein described are the PRI and RF of each beam. However, it will become apparent upon an understanding of the operation of the preferred embodiment, that the scope of the present invention extends to the control of any particular threat signal parameter which, for example, could include the number of beams, scan type, or pulse doppler or continuous wave identification bits or any combination of such threat signal parameters.

The threat signals determined from the RF, TOA and amplitude information provided to the central processing unit 12 from the memory buffer 52 are tracked by the multiplexed signal tracker 10 described in FIGS. 3-9. The signal tracker 10 makes predictions as to the RF and PRI of received threat signals and provides corresponding control signals to the receiver control 20 to cause the receiver 15 to detect the threat signals if they, in fact, occur. The signal tracker of FIG. 3 tracks all phase coherent beams of a single threat signal provided at least one beam of the threat signal is present by maintaining all PRI values for multiple beam threat signals in a single memory associated with each threat signal. The order of access of the memory containing the PRI values is determined by a beam pointer whose time of access is controlled by a beam monitor which is operative with a particular address in a TOA memory that is associated with the threat signal that is being tracked.

Figure 3:
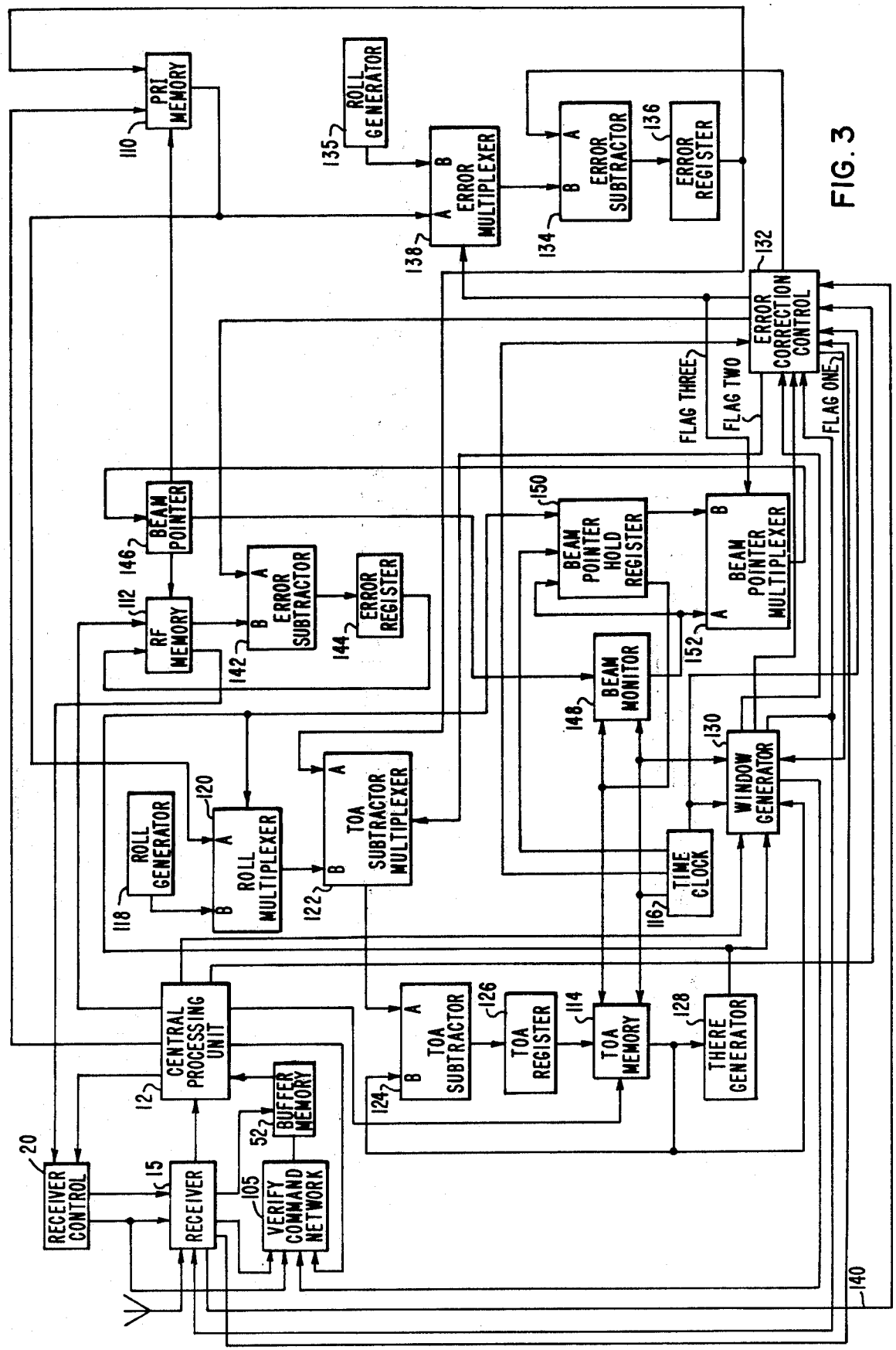
FIG. 3 is a more detailed block diagram of the multiplexed tracker of FIG. 1 which predicts the time of arrival of pulses of a beam at the receiver.

FIG. 3 shows a block diagram of the preferred embodiment of the multiplexed tracker 10, portions of which are further described in FIGS. 4, 5, 6, and 7. The detected threat signal which, for purposes of illustration, may be considered to be the pulse train shown in waveforms 2A and 2B of FIG. 2, are detected by the receiver 15 and delivered through the buffer memory 52 to the central processing unit 12 which establishes an initial PRI and phase condition for each of the phase coherent beams of the threat signal. For each beam of the threat signal, the central processing unit 12 stores an initial PRI value at a specified address in a PRI memory 110 and an initial RF value at a corresponding address in an RF memory 112. Simultaneously, the central processing unit 12 dedicates a tracker address in a TOA memory 114 to the threat signal and stores a value representing the predicted time of arrival (TOA) of the next pulse in the threat signal at this address. Therefore, the number of independent threat signals that can be tracked is limited only by the number of tracker addresses in the TOA memory 114 and the number of beams of a particular threat signal that can be tracked is limited only by the number of addresses in the PRI memory 110 and the RF memory 112 which are associated with a particular tracker address of the TOA memory 114.

The predicted time of arrival stored in the address of the TOA memory 114 is counted down by a means for counting toward the predicted time of arrival of pulses contained in all beams of a detected threat signal. The counting means includes the TOA memory 114, a time clock 116, a roll generator 118, a roll multiplexer 120, a TOA subtracter multiplexer 122, a TOA subtracter 124, and a TOA register 126. Each time the predicted time of arrival stored at the address of the TOA memory 114 that is dedicated to the detected threat signal is accessed by the time clock 116, the roll generator 118 delivers a signal, whose value is substantially equal to $\Delta t$, to terminal A of the TOA subtracter 124 through the roll multiplexer 120 and the subtracter multiplexer 122. The roll generator 118 may, in practice, be a hard wired bit of the roll multiplexer 120. The initial predicted time of arrival previously stored in the TOA memory 114 in accordance with the initial acquisition of the detected threat signal is provided to terminal B of the TOA subtracter 124, which then subtracts the value of the signal provided at terminal A from the value of the signal provided at terminal B to provide an output whose value is substantially equal to the value of the predicted time of arrival for the signal pulse decremented by an amount $\Delta t$. In the design of the roll generator 118, the value of $\Delta t$ is made equal to one roll which is the real time which elapses between successive accesses of a single tracker address in the TOA memory 114 by the real time clock 116 so that the predicted time of arrival of the next pulse of the signal is decremented in real time. The output of the TOA subtracter 124 is provided to the TOA register 126 which then delivers this value to the tracker address in the TOA memory 114. The next time the tracker address of the TOA memory 114 is accessed by the real time clock 116, this decremented value of the initial predicted TOA is again itself decremented by again subtracting from it a value equal to one roll in the TOA subtracter 124, as described above. This decrementing process continues until the value provided to the tracker address in the TOA memory 114 by the TOA register 126 is less than or equal to some predetermined value of time which will be identified as W/2.

When the predicted time of arrival stored in the tracker address of the TOA memory 114 has been counted down to the value of W/2, the value of the memory address is provided to a There generator 128 that causes the There generator 128 to provide a There signal which performs two functions. First, the There signal is provided as a control input to the roll multiplexer 120 to cause the roll multiplexer 120 to convey a predicted pulse repetition interval for the next pulse of the detected threat signal from the PRI memory 110 to terminal A of the TOA subtracter 124 through the subtracter multiplexer 122. This function provides for a variation in the predicted pulse repetition interval of the next pulse one example of which is illustrated by the waveform 9A which is hereafter discussed in relation to FIG. 9. Secondly, the There signal provided by There generator 128 is delivered to a window generator 130 that provides a window pulse which corresponds to the pulse of the detected threat signal which was predicted to arrive at the receiver 15 at time W/2 subsequent to the generation of the There signal. The There generator 128 and the window generator 130 are described later in further detail in FIGS. 4 and 5, respectively.

The window signal of the window generator 130 is provided to line 40 (FIG. 1) which provides the enable signal to the receiver 15 thereby enabling the receiver 15 to detect pulses corresponding to the amplitude and RF determined by the amplitude and RF control signals on the lines 36 and 38. The window signal is simultaneously provided to the error correction control 132 along with the signal pulses detected by receiver 15 and count signals from the time clock 116 to provide phase and pulse repetition interval error signals. In addition, the error correction control 132 provides flag signals which serve to control the multiplexing of phase corrections to be made to the predicted time of arrival stored in the TOA memory 114, pulse repetition interval corrections to be made to the predicted pulse repetition interval stored in the PRI memory 110, and RF corrections to be made to the predicted RF stored in the RF memory 112, as will be explained below.

Figure 6:
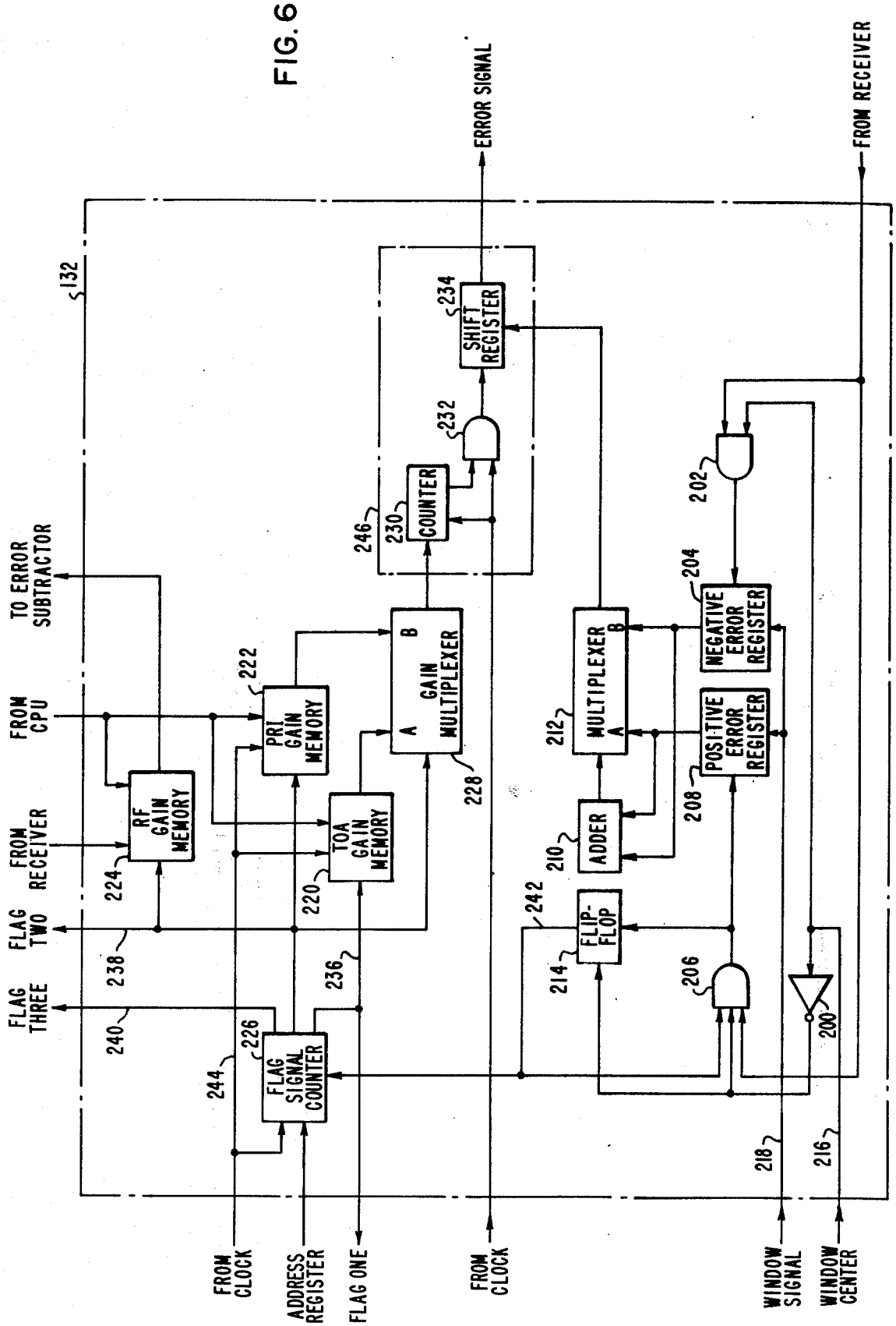
FIG. 6 is a more detailed block diagram of the error correction control shown in FIG. 3.

As will be further described in relation to FIG. 6, the error correction control 132 provides flag one, flag two, and flag three control signals. During the occurrence of the flag one control signal, the gain for the phase error of the predicted time of arrival is extracted from a memory element. Subsequent to this first flag signal and prior to a second flag signal, this phase error gain is binarily multiplied by the deviation of the predicted time of arrival from the actual time of arrival determined by error correction control 132 to provide the phase correction which is transferred to an error subtracter 134 for processing. The phase error signal of the error correction control 132 is provided to terminal A of the error subtracter 134. At this time, terminal B of the error subtracter 134 is provided with a value of Δt from a roll generator 135 through terminal B of an error multiplexer 138. In a fashion similar to the TOA subtracter 124, the error subtracter 134 computes the difference between the value of one roll determined by the roll generator 135 and the deviation between the predicted time of arrival and the actual time of arrival determined by the error correction control 132. This difference is provided to an error register 136 and, upon the occurrence of a flag two control signal provided by the error correction control 132 to the subtracter multiplexer 122, the difference is then multiplexed through the TOA subtracter multiplexer 122 into terminal A of the TOA subtracter 124 to correct the phase of the predicted time of arrival. As is well known in the art, the subtracter multiplexer 122 is conjunctive in its nature in that it can produce at its output only signals provided to either terminals B or A, depending upon the absence or presence of a flag two control signal respectively. Although the predicted time of arrival value for the signal pulse must be continuously counted down in order to maintain coherence with real time, the one roll value of the roll generator 118 could not be introduced through the roll multiplexer 120 into the TOA subtractor 122 at the same time that the correction for the phase was made. Therefore, it will be appreciated that the roll generator 135 is necessary to subtract the Δt value of one roll from the error determined by the error correction control 132 prior to the application of the error signal to terminal A of the subtracter multiplexer 122.

During the occurrence of the flag two signal, the gain for the pulse repetition interval error is extracted from a memory element in the error correction control 132. Subsequent to the occurrence of the flag two signal and prior to the flag three signal, the pulse repetition interval error gain is multiplied by the deviation of the predicted time of arrival from the actual time of arrival determined for the pulse repetition interval by the error correction control 132. As with the error for the phase of the predicted time of arrival, the error for the pulse repetition interval for the predicted time of arrival is provided to the error subtractor 134 to determine the necessary corrections for the pulse repetition interval value stored in the PRI memory 110. This correction is accomplished by providing the flag three signal to the error multiplexer 138 causing the output of the error multiplexer 138 to provide the value supplied to its A terminal from the memory address of the PRI memory 110 so that the error subtractor 134 subtracts the error determined for the PRI by the error correction control 132 from the former PRI value stored at the address of the PRI memory 110. This new PRI value is provided to the error register 136 and is then returned to the appropriate address in the PRI memory 110 from which it may be called to predict the time of arrival for the next pulse of the beam for which it is predicting.

The RF of the pulse of the beam is corrected simultaneously with the PRI of the pulse. During the occurrence of the flag two control signal of the error correction control 132, the gain of the RF error of the predicted TOA is extracted from a memory element included in the error correction control 132. Subsequent to this second flag signal and prior to a third flag signal, the RF error gain is binarily multiplied by the deviation of the predicted RF from the actual RF determined by the receiver 15 and provided to the error correction control 132 on the line 140. The product of the RF gain and the RF error signal which provides the RF correction is transferred to an error subtracter 142 for processing. The RF error signal of the error correction control 132 is provided to terminal A of the error subtracter 142. At the same time, the error subtracter 142 is provided with the former RF value of the RF memory 112 so that, in a manner analogous to the error subtracter 134, the error subtracter 142 subtracts the error determined for the RF by the error correction control 132 from the former RF value stored at the address of the RF memory 112. This new RF value is provided to the RF error register 144 and is then returned to the appropriate address in the RF memory 112 from which it may be called to predict the RF for the next pulse of the beam for which it is predicting.

From the explanation made with regard to FIGS. 1, 2 and 3, it can be seen that, where threat signals having multiple beams are to be tracked by a single tracker, a means must be provided for storing the various PRI values, establishing their order of succession, and monitoring their position. The means for storing an arbitrary number of PRI values which correspond to a single tracker includes the PRI memory 110 while the means for establishing their order of succession and monitoring their position includes the beam pointer 146 and beam monitor 148 respectively. For each tracker address in the TOA memory 114, the PRI memory 110 and the RF memory 112 are provided with a number of addresses sufficient to accommodate the highest number of beams which are to be tracked by the corresponding tracker. Corresponding to each address in the PRI memory 110 and the RF memory 112 is an address in the beam pointer 146 which is also comprised of a memory unit. Where the succession of the examination of the beams of the tracker is to remain in a fixed relation, the beam pointer 146 may be comprised of a read only memory having predetermined fixed values for each memory address. Where additional flexibility is required, the beam pointer 146 may be comprised of a read-write memory so that the order of succession of PRI addresses in the PRI memory 110 and RF memory 112 may be changed by writing into the beam pointer 146. Corresponding to each tracker address in the TOA memory 114 is an address in the beam monitor 148 which is also comprised of a memory element. Since the beam monitor 148 must have the capability of successively storing the values at the addresses of the beam pointer 146, the beam monitor 148 must be a memory of the read-write variety. Each address in the beam monitor 148 corresponds to a tracker address in the TOA memory 114 and is accessed at the same time as the corresponding tracker memory address by the time clock 116 so that each time the TOA memory 114 is accessed, the PRI address from the PRI memory 110 and the RF address from the RF memory 112 are selected in the following manner.

On a write signal provided by a beam pointer hold register 150 to the TOA memory 114 and the beam monitor 148, the information contained at the address of the beam pointer 146 that corresponds to the address of the PRI memory 110 which is currently accessed, is written into the beam monitor 148 at the address corresponding to the tracker address of the TOA memory 114. This information remains at this address of the beam monitor 148 until the monitor address is accessed by the clock 116 at which time the value which had been written in by the beam pointer 146 is transferred to terminal A of a beam pointer multiplexer 152 and provided as the output of the beam pointer multiplexer 152 to the addresses of the PRI memory 110, the RF memory 112, and the beam pointer 146 in which it is used to select the next address of the PRI memory 110 and the RF memory 112. The information of the beam pointer 146 associated with this next address is then written into the address of the beam monitor 148 associated with the tracker address of the TOA memory 114 currently accessed by the time clock 116 so that the process continues upon each access of the addresses of the TOA memory 114 and the beam monitor 148 by the time clock 116. It will be seen that, if the values in the addresses of the beam pointer 146 associated with each address in the PRI memory 110 and the RF memory 112 are the next addresses of the PRI memory 110 and the RF memory 112 which are desired, the beam pointer 146 will cooperate with the address in the beam monitor 148 associated with the tracker address in the TOA memory 114 to provide the proper order of succession in which the beams will be examined. It can be seen from the above discussion that the beam pointer 146 controls the next address of the PRI memory 110 and the RF memory 112 through the address of the beam monitor 148 associated with the TOA memory 114.

As an illustration of the selection of addresses of the PRI memory 110 and the RF memory 112 through the beam pointer 146 and the beam monitor 148, consider the table shown as follows:

accessed in the PRI memory 110 and the RF memory address which is accessed in the RF memory 112 are determined by the digital number written into the address of the beam monitor 148 corresponding to the tracker address in the TOA memory 114. In the illustration of the table, the beam pointer 146 had written into the beam monitor 148 a digital one so that the next PRI and RF values selected would be the values located at the "one" address of the PRI memory 110 and the RF memory 112. At the same time, the address in the beam pointer 146 corresponding to the one address in the PRI memory 110 and the RF memory 112 contains a digital two which is written into the beam monitor 148 at the address corresponding to the tracker address of the TOA memory 114. The next time a There signal is provided to the roll multiplexer 120, the address of the beam monitor 148 corresponding to the tracker address of the TOA memory 114 indicates that the PRI and RF values stored at the digital "two" locations of the PRI memory 110 and the RF memory 112 should be used. At the same time, the address in the beam pointer 146 corresponding to the digital two address in the PRI memory 110 and the RF memory 112 contains a third value, a digital three which is written into the address of the beam monitor 148 corresponding to the tracker address of TOA memory 114. In the same manner as before, when this predicted time of arrival has been counted down to the W/2 value and a There signal is provided to the roll multiplexer 120 so that the next PRI value is called from the PRI memory 110 and the next RF value is called from the RF memory 112, the value provided will be that stored at the digital three address of the PRI memory 110 and the RF memory 112 respectively. The address of the beam pointer 146 corresponding to the digital three address of the PRI memory 110

| INITIAL VALUES | | | | | | | | | | | | | | | | |
|---|---|---|---|---|---|---|---|---|---|---|---|---|---|---|---|---|
| BEAM POINTER ADDRESS | | | | INFORMATION WORD | | | | AD-DRESS | | | BEAM MONITOR INFORMATION WORD | | | | | |
| 0 | 0 | 0 | 0 | 0 | 0 | 0 | 1 | 0 | 0 | 0 | 0 | 0 | 0 | 0 | | 1 |
| 0 | 0 | 0 | 1 | 0 | 0 | 1 | 0 | | | | | | | | | |
| 0 | 0 | 1 | 0 | 0 | 0 | 1 | 1 | | | | | | | | | |
| 0 | 0 | 1 | 1 | 0 | 0 | 0 | 0 | | | | | | | | | |

| SEQUENCE OF VALUES IN BEAM MONITOR | | | | | |
|---|---|---|---|---|---|
| ACCESS TO BEAM MONITOR ADDRESS | BEAM MONITOR INFORMATION WORD | | | | |
| FIRST THERE | 0 | 0 | 1 | 0 | |
| SECOND THERE | 0 | 0 | 1 | 1 | |
| THIRD THERE | 0 | 0 | 0 | 0 | |
| FOURTH THERE | 0 | 0 | 0 | 1 | |

In the case of the above table, the particular tracker is to track a pulse train having a four level stagger. As explained previously, this pulse train can equivalently be considered as a threat signal comprised of four phase coherent beams. Therefore, the PRI memory 110, the RF memory 112 and the beam pointer 146 must have at least four addresses corresponding to the tracker address of the TOA memory 114 which is dedicated to tracking this threat signal. The initial condition considered in the closed loop of the table shows that the address of the beam monitor 148 associated with the tracker address of the TOA memory 114 contains a digital one so that the beam monitor 148 is pointing to the address one of the PRI memory 110, the RF memory 112 and the beam pointer 146. The table also shows that associated with the one address of the beam pointer 146 is an information word having a value of a digital two. When the next There signal is provided to the roll multiplexer 120, the PRI memory address which is accessed in the PRI memory 110 and the RF memory 112 has a value of digital zero which is then written into the address of the beam monitor 148 corresponding to the tracker address in the TOA memory 114 to initiate the next round of the above-described cycle.

As was explained previously, corrections in the values stored at the PRI addresses of the PRI memory 110 are made by the error loop which includes the error correction control 132, the roll generator 135, the error multiplexer 138, the error subtracter 134 and the error register 136. It will be appreciated that, once this error in the PRI value is determined, this corrected PRI value must be returned to the proper address of the PRI memory 110 to maintain the correct sequence in the order of succession of PRI values between the pulses of successive beams. For this purpose, the disclosed apparatus is provided with the beam pointer hold register 150 and the beam pointer multiplexer 152. The beam pointer hold register 150 retains the address of the prior PRI memory value and the prior RF memory value which had been contained in the beam monitor 148, until such time as the PRI and RF corrections can be made. The pointer hold register 150 is further described in relation to FIG. 7. When the corrected PRI and RF values are to be entered in the PRI memory 110 and the RF memory 112 respectively, the appropriate address of PRI memory 110 and the RF memory 112 are multiplexed to the memories through terminal B of the beam pointer multiplexer 152 by applying the flag three signal to the beam pointer multiplexer 152.

FIG. 3 also shows that, by operating the real time clock 116 at a faster counting rate than is necessary to decrement a single tracker, and by expanding the number of addresses in the TOA memory 114 and the beam monitor 148 to accommodate the number of threats which are to be tracked, and by expanding the address dimensions of the PRI memory 110, the RF memory 112 and the beam pointer 146 to accommodate the increased number of trackers, basic multiplexing techniques can be used to provide a tracker capable of tracking an arbitrary number of threats while, except for the above-described expanded memory capabilities, requiring only the hardware necessary for a tracker which tracks single threats. As a specific example, if the disclosed tracker were to have the capability of tracking sixteen threats, the real time clock 116 would be multiplexed among sixteen addresses of the TOA memory 114 and the beam monitor 148. Further, if the tracker were to have the capability of tracking threats which included as many as four beams, the PRI memory 110, the RF memory 112, and the beam pointer 146 would be comprised of memory elements having a total of sixty four (16×4) addresses.

It will be appreciated that in an environment which is densely populated with microwave signals comprising threat signals such as described herein, it is highly probable that the pulses of two or more of these threat signals may occur simultaneously. For a multiplexed tracker, such as the one described in relation to FIG. 3, which is simultaneously tracking a multiple of threat signals by making TOA, PRI and RF predictions for the various threat signals on a time-sharing basis, it is necessary to have the capability of determining which threat signal should be tracked when the pulses of the threat signals simultaneously occur. Therefore, as more fully described in relation to FIG. 5, the window generator 130 of the multiplexed tracker includes the tracker priority logic 168 which determines the order in which the tracker addresses of the TOA memory 114 which are competing for a window signal, will obtain a window signal output from the window generator 130 in response to a There signal from the There generator 128. Briefly, each tracker address of the TOA memory 114 is associated with a priority number in the tracker priority logic 168. This priority number is established in relation to the frequency with which the tracker address has been unable to obtain a window in response to a There signal. Specifically, whenever a There signal occurs in relation to a tracker, the priority count of that tracker is incremented by a digital one. If the tracker obtains a window signal, the priority count is returned to zero at the completion of the window signal.

If more than one tracker should need a window at the same time, a priority comparison is made to determine which tracker should have the window. The tracker having the highest priority is given the window signal. If the tracker which had the window signal first has the highest priority, it will retain the window, but if the tracker that attempts to obtain a window signal subsequent in time has the highest priority, the subsequent tracker will be given a window and the first tracker will be "bumped" out of its window. When the tracker is unable to complete a window signal, either because the tracker could not obtain a window signal or because the tracker was bumped out of its window by another tracker having higher priority, the tracker priority is saved until the next There signal occurs and a digital one is added to the priority number which was preserved. If the tracker is again competing with another tracker for the window, the new, higher priority will be compared to the priority of the other tracker to determine which tracker will have the window. If the tracker obtains the window and is able to complete the window, the priority will be returned to zero, but if the tracker is competing with another tracker having a higher priority and is therefore either unable to obtain a window or is unable to complete the window it has obtained, the tracker priority is again saved and is incremented by a digital one upon the occurrence of the next There signal associated with the tracker. Since the trackers which are able to obtain and complete their windows have their priorities returned to zero, the tracker will eventually have a higher priority than any of the other trackers with which it is competing for the window and will, therefore, obtain and complete the window. As will be explained in more detail in relation to FIG. 5, the tracker that is tracking a threat signal which is being verified will always be given priority over other trakcers so that a reliable tracker verification operation can be performed.

Figure 4:
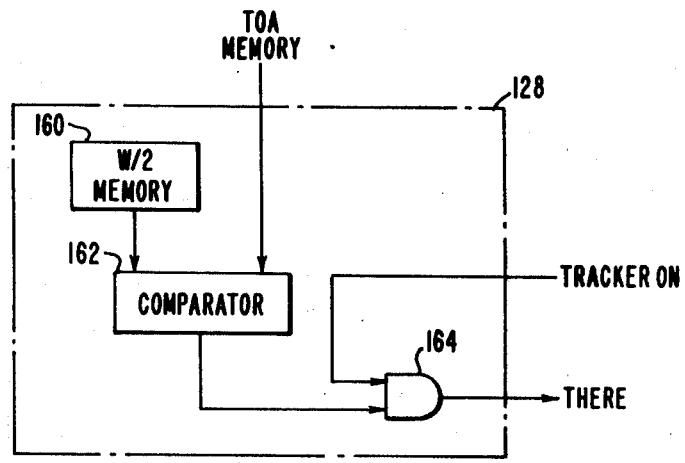
FIG. 4 is a more detailed block diagram of the There generator shown in FIG. 3.

FIG. 4 shows a mor detailed block diagram of the There generator 128 shown in FIG. 3 and includes a W/2 memory 160, a comparator 162 and an AND gate 164. The predicted time of arrival provided by the TOA memory 114 is compared with a W/2 value provided by the W/2 memory 160 in the comparator 162 which provides an output whenever W/2 is greater than or equal to the predicted time of arrival value. The output of the comparator 162 comprises the input necessary to produce a signal at the output of the AND gate 164 which constitutes the There signal when the central processing unit 12 indicates that the tracker has been turned on.

Figure 5:
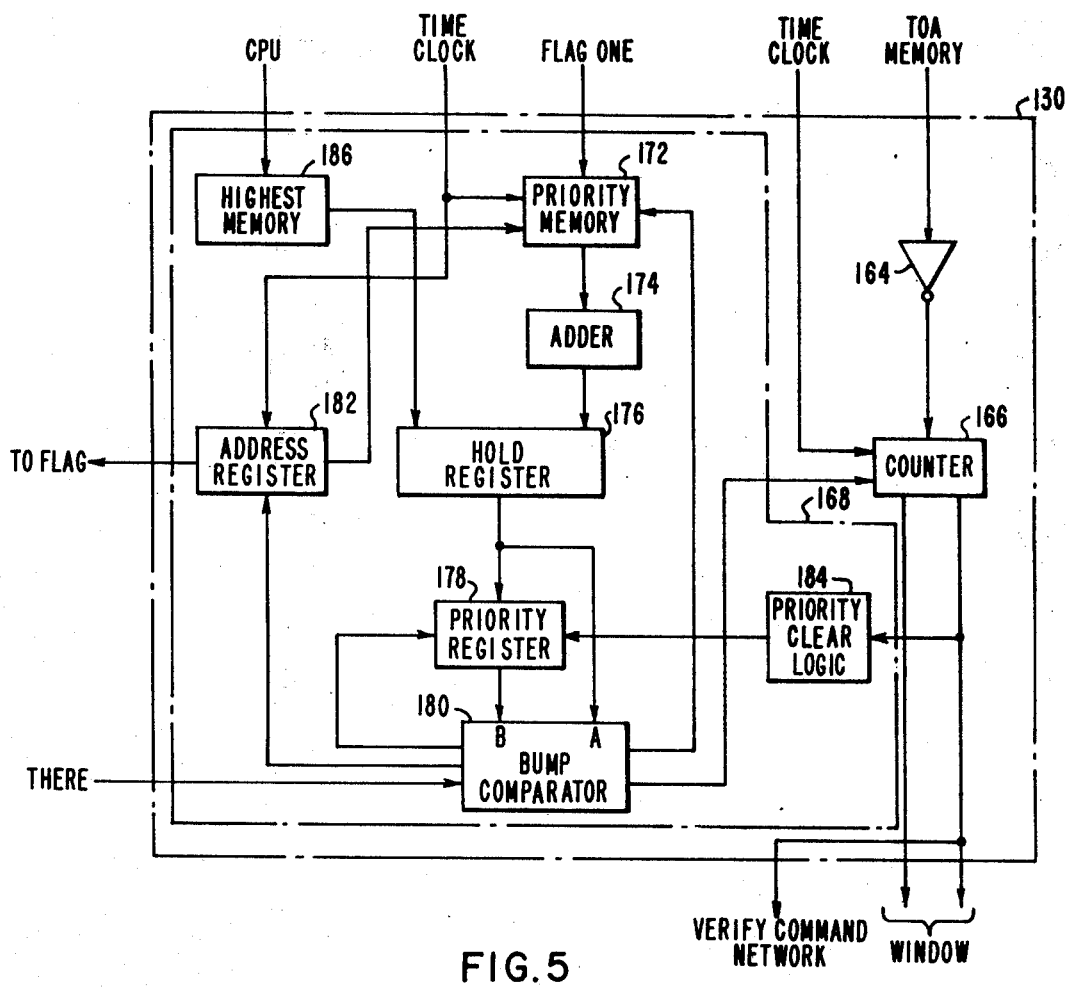
FIG. 5 is a more detailed block diagram of the window generator shown in FIG. 3.

FIG. 5 shows in greater detail the window generator 130 which was previously shown in FIG. 3 and includes an inverter 164, a counter 166 and the tracker priority logic 168. When the inverter 164 is provided with the output TOA value of the TOA memory 114 (FIG. 3) and when the window counter 166 is provided with a prediction signal from the tracker priority logic 168 and a clock signal from the clock 116 (FIG. 3), the window signal is provided at the output of the counter 166. The window counter 166 begins to count at a value substantially equal to W/2 less than zero upon receiving a prediction signal from the tracker priority logic to open the window and continues to count through zero to a value substantially equal to w/2 greater than zero at which point the counter 166 stops counting, thereby closing the window. The most significant bit of the counter 166 provides the tracker prediction signal to the verify command network 105 in response to the inputs from the TOA memory 114, the tracker priority logic 168, and the clock 116.

The tracker priority logic 168 which controls the priority of access of the tracker addresses of the TOA memory 114 to the window generator 130 includes a priority memory 172, an adder 174, a hold register 176, a priority register 178, a bump comparator 180, an address register 182, priority clear logic 184, and a highest memory 186. The priority memory 172 is responsive to the tracker address signal from the time clock 116 (FIG. 3) such that when the address signal is applied to the priority memory 172, the priority valve stored in the priority memory 172 at the address determined by the address signal from the time clock 116 is provided to the adder 174 where a digital one is added to the priority valve formerly stored in the priority memory 172. The sum which is determined by the adder 174 is provided to the hold register 176 where it is temporarily stored. Initially, the priority register 178 is provided with a zero value from the priority clear logic 184 in response to the close of the previous window signal as will be more fully explained hereafter. A There signal corresponding to the tracker which was addressed by the time clock 116 is applied to the bump comparator 180 which then compares the priority value of the hold register 176 to the priority value of the priority register 178. If the priority value of the hold register 176 is larger than the priority value of the priority register 178, the There signal causes the bump comparator 180 to provide a prediction signal to the counter 166 which then begins counting out the window signal. Additionally, the magnitude and address of the priority value are stored in the priority register 178 and the address register 182 respectively. Since the value stored in the priority register 178 by the priority clear logic at the close of a window signal is zero, the first tracker to request a window by providing a There signal after the window has closed will get the window. Furthermore, if no other trackers request a window before the window of the first tracker is completed, the first tracker will also complete the window. However, if there are other tackers which are competing with the first tracker for the window signal, whether the first tracker will complete the window signal will depend upon its having at least as high a priority as all the other trackers with which it is competing. As long as the value of the first tracker is at least as high as the priority value of the other competing trackers, the value applied to terminal A of the bump comparator 180 will be less than or equal to the value applied to terminal B of the bump comparator 180 and the value applied to terminal A will be written into the priority memory 172 at the address of the subsequent tracker, thereby increasing the value of the priority number for that tracker. Therefore, the next time that the ttacker requests a window signal, it will obtain the window signal unless it is still competing with other trackers which have priority values that are at least as large as its own. If, in this case, the tracker still does not get the window, its priority will again be increased so that it will have an even higher priority the next time it requests a window signal. Eventually, therefore, the priority of the tracker will be incremented to the point where it has sufficient priority to obtain and complete a window signal.

When a tracker has a higher priority than the tracker which already has a window signal in response to a There signal, the tracker with the higher priority will preempt or "bump" the tracker with the lower priority from the use of the window. In this situation the priority value applied to the "A" terminal of the bump comparator 180 will exceed the priority value applied to the "B" terminal of the bump comparator 180, as in the case of the first tracker to request a window after the close of the preceding window signal as was referred to earlier. When the priority value applied to terminal "A" exceeds the priority value applied to terminal "B", the bump comparator 180 provides the magnitude of the priority value for the new tracker to the priority register 178 and also provides the address for the tracker associated with this priority to the address register 182.

At the same time that the magnitude of the new priority is provided to the priority register 178 and the address of the tracker associated with this magnitude is provided to the address register 182, the priority of the prior tracker which was provided to terminal B is returned to the priority memory 172 where it is stored at the address provided by the address register 182 until the trakcer is again accessed by the time clock 116. In this manner, the priority values of ttackers which did not get a window signal in response to a There signal and the priority values of trackers which obtained a window signal but were preempted, or bumped, by a tracker having a higher priority are preserved in the priority memory 172. Since the priority values are incremented each time that they are accessed by the time clock 116, the tracker priority will continue to increase until the tracker is able to obtain and complete a window.

When the window for a tracker is obtained and completed, the priority clear logic 184, which is responsive to the output of the counter 166, clears the magnitude of the priority for that tracker to zero. The priority clear logic can be comprised of a memory element which is responsive to the most significant bit of the counter 166. Since the priority value in the priority register 178 is cleared to zero at the end of the window, and since the priority value applied to termnal A of the comparator 180 is always at least one due to the operation of the adder 174, as between trackers competing for a window, the first tracker requesting a window after the completion of a window by another tracker will bump the tracker which last completed a window from the priority register 178. In response to the time clock 116, the address register 182 provides an input to the flag signal counter of the error correction control 132. In response to this input, the flag signal counter of the error correction control provides the flag one signal to the priority memory 172 which records the priority value for the tracker as zero.

The tracker priority logic 168 also includes a highest memory 186 which is responsive to the tracker verification signal of the central processing unit 12 to provide overriding priority to the tracker which is tracking a threat signal which is being verified. During the tracker verification operation, the central processing unit 12 provides a continuous tracker verification signal to the highest memory 186. In response to the tracker verification signal from the central processing unit 12, the highest memory 186 sets the most significant bit in the hole register 176 such that priority value for this tracker is higher than any priority value which can be obtained from the priority memory 172 in the normal operation of the tracker priority logic 168. Thereafter, the tracker priority logic 168 operates such that the priority of the tracker that is tracking the threat signal being verified will always be the highest priority among trackers and, therefore, the tracker that is tracking the threat signal that is being verified will always get a window in response to a There signal while other trackers will not get a window while the tracker verification signal is present.

The window generator 130 also provides the tracker prediction signal to the verify command network 105 in response to the most significant bit of the counter 166. The tracker prediction signal provides a pulse in response to the pulse which the threat signal is predicted to have but provides no pulses in response to other threat signals being tracked due to the overriding priority of the highest memory 186.

FIG. 6 shows a more detailed block diagram of the error correction control 132 shown in FIG. 3. As explained in relation to FIG. 3, the error correction control 132 determines the error between the pulse occurring closest to the center of the window signal provide by window generator 130 and determines a correction for the phase, PRI and RF of the predicted time of arrival for the beam by multiplying this error by the phase, RF and PRI gains stored in a memory. The error correction control 132 also generates appropriate flag signals for multiplexing the phase, PRI and RF corrections into the TOA memory 114, the PRI memory 110 and the RF memory 112 respectively. the portion of that error correction control 132 which determines the pulse occurring closest to the center of the window signal provided by the window generator 130 includes an inverter 200, an AND gate 202, a negative error register 204, and AND gate 206, a positive error register 208, an adder 210 a multiplexer 212, and a flip-flop 214.

The window signal from the window generator 130 is provided to the error correction control 132 on lines 216 and 218, the signal on line 216 being responsive to the state of the most significant bit of the counter 166 (FIG. 5) so that the signal on line 216 is indicative of the center of the window signal. When the counter 166 of the window generator 130 begins counting, the signal on line 216 enables pulses detected by the receiver 15 to pass through the AND gate 202 and gate the pulse count of the counter 166 into the negative error register 204. Subsequent pulses from the receiver 15 will similarly gate the count value of the counter 166 into the negative error register 204 until the signal on line 216 indicates that the counter has passed the center of the window signal. Therefore, the value in the negative error register 204 is the value corresponding to the number of counts made by the counter 166 between the last beam pulse received by the receiver 15 and the center of the window signal. When the counter 166 has crossed the center of the window, the signal on line 216 will then operate through the inverter 200 to enable the first pulse detected by the receiver 15 to pass through the AND gate 206 to gate the value of the counter 166 into the positive error register 208. A signal passing through the AND gate 206 also causes the flip-flop 214 to change state so that no subsequent pulses can pass through the AND gate 206 until the flip-flop 214 is reset by the termination of the window pulse. The contents of the negative error register 204 and the positive error register 208 are added in the binary adder 210 which causes the output of the multiplexer 212 to be provided from terminal "A" if the sign of the sum is positive, and which causes the output of the multiplexer 212 to be provided from terminal "B" if the sign of the sum is negative.

The apparatus for providing corrections for the phase, PRI and RF of the predicted time of arrival includes a TOA gain memory 220, a PRI gain memory 222, an RF gain memory 224, flag signal counter 226, a gain multiplexer 228, a counter 230, an AND gate 232 and a shift register 234.

The control signals flag one, flag two, and flag three, which have been previously referred to, are provided on lines 236, 238 and 240, respectively, in response to signals provided by the clock 116 and the output of the flip-flop 214 on line 242 which indicates the detection of a pulse in the positive half of the window or which indicates the end of a window if no pulses were detected by receiver 15 during the positive half of the window. The gain for the phase error is provided by the TOA gain memory 220 in response to a signal from clock 116 on line 244 and in response to the flag one signal on line 236, and passes through the gain multiplexer 228 in the abdsence of a flag two signal from the flag signal counter 226. The gain for the pulse repetition interval is provided by the PRI gain memory 222 in response to a signal from the clock 116 on line 244 and in response to a flag two signal on line 238, and passes through the gain multiplexer 228 with the presence of a flag two signal on line 238. The error gains provided by the TOA gain memory 220 and by the PRI gain memory 222 through the gain multiplexer 228 are multiplied by the deviation of the predicted TOA from the actual TOA by the binary multiplier 246. The binary multiplier 246 includes counter 230, the AND gate 232 and the shift register 234, combined as shown in FIG. 6 in a manner well known to those skilled in the pertinent art. The RF gain memory 224 is responsive to the flag two signal and is also responsive to the RF of the detected pulse to provide the corrected RF for the RF memory 112. The corrected RF is provided to the RF memory 112 in response to the application of the flag two signal to the RF gain memory 224.

Figure 7:
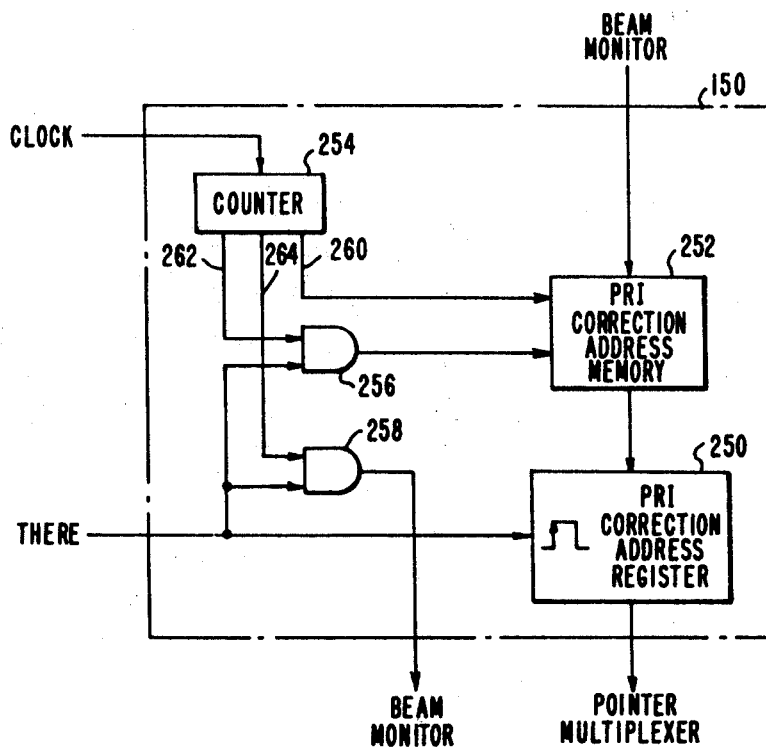
FIG. 7 is a more detailed block diagram of the pointer hold register shown in FIG. 3.

The beam pointer hold register 150 which is shown in FIG. 3 is further described in FIG. 7 and includes a PRI correction address register 250, a PRI correction address memory 252, a counter 254, an AND gate 256, and an AND gate 258. As explained previously, the pointer hold register 150 retains the values of the prior information word stored in the beam monitor 148 after the monitor has, for each tracker address of the TOA memory 114, been written into by the beam pointer 146 on the occurrence of a There signal.

In response to the clock 116, the counter 254 first provides an address signal on line 260 to the PRI correction address memory 252 while the information word which is to be retained is contained in the beam monitor 148. Next, the counter 254 provides a second signal on line 262 which cooperates with a There signal provided by the There generator 128 to provide a write pluse at the output of the AND gate 256 to latch the information of the beam monitor 148 into the PRI correction address memory 252. Then, after the termination of the second signal, the counter 254 provides a third signal on line 264 which cooperates with the There signal provided by the There generator 128 to provide a write pulse at the output of the AND gate 258 to latch the information of the beam pointer 146 into the beam monitor 148. However, the prior information word of the beam monitor 148 is still contained on the PRI correction address memory 252 and is available to be brought into the PRI correction address register 250 on the rising edge of the next There signal of the There generator 128. In this manner, the information word contained in the PRI correction address register 250 provides the proper address of the PRI and RF values of the PRI memory 110 and the RF memory 112 which are to be corrected by the error correction loop.

Figure 8:
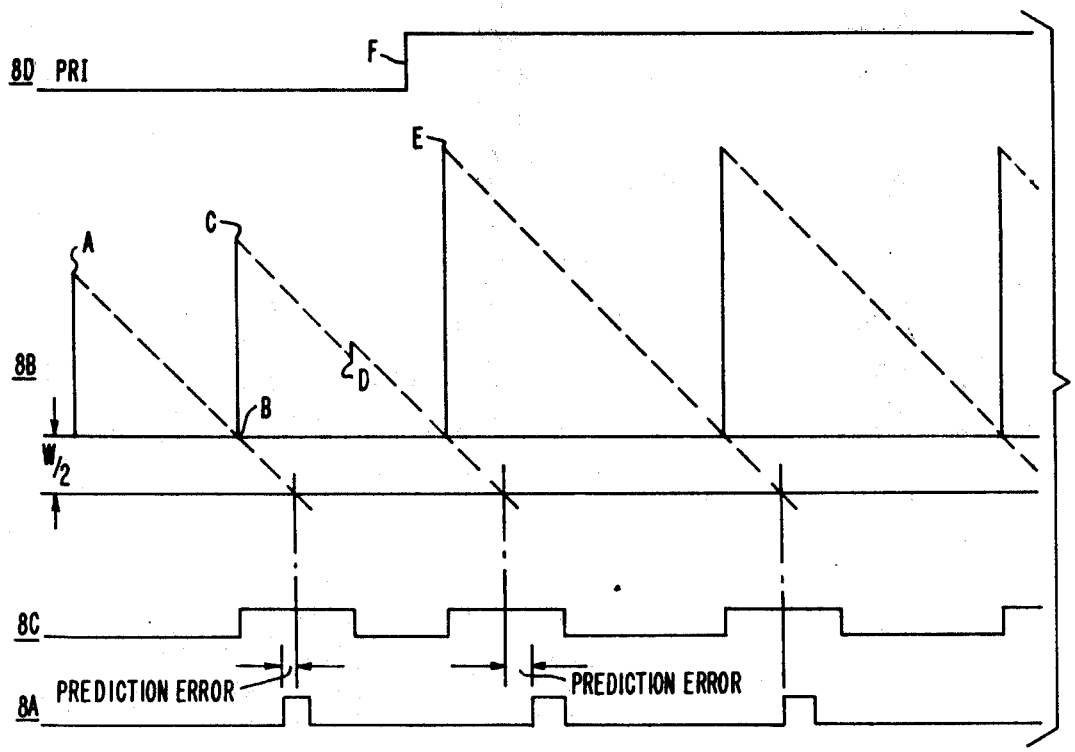
FIG. 8 illustrates the operation of the signal tracker of FIG. 1 and FIGS. 3 through 7 while tracking a pulse train of a single beam.

The operation of the disclosed multiplexed phase coherent signal tracker of the preferred embodiment which is shown in FIGS. 3 through 7 is illustrated generally in FIG. 8 for the example of the disclosed tracker tracking the single beam waveform 2A of FIG. 2. Although the disclosed tracker is capable of tracking a threat which exhibits an arbitrary number of beams, the operation of the multiplexed tracker will be easier to comprehend by first using the example of a threat signal having a single beam. In FIG. 8, the vertical axis represents the predicted time of arrival of the pulse of waveform 2A which has been redrawn in FIG.. 8 as the waveform 8A. The horizontal axis of FIG. 8 represents real time. Initially, the tracker is provided with PRI and RF values by signal acquisition methods previously described in relation to FIG. 1. The initial PRI is periodically decremented by a predetermined discrete value of time $\Delta t$ to count toward the predicted time of arrival of the next pulse in the beam. As illustrated in FIG. 8, the initial PRI is decremented from point A and continues to be decremented to point B as indicated generally by the dashed line. At point B, the tracker provides a window signal shown as the waveform 8C during which the pulse which was predicted at point A will be anticipated by the receiver 15. As indicated at point B, the pulse of the window signal 8C is generated when the predicted time of arrival reaches a value which is essentially equal to one-half the pulse-width of the window signal pulse. This is indicated in FIG. 8 by showing point B to be set at W/2, an arbitrary but predetermined value above the real time ordinate. At the same time that the tracker generates the window signal pulse as shown in waveform, 8C, the tracker begins counting down the predicted time of arrival for the next pulse of the threat signal which, in the example of FIG. 8, is shown as point C. If a pulse of the threat signal is not found to be within the pulse-width of the previous pulse of the window signal waveform, the predicted TOA will continue to be steadily decremented by discrete amounts of $\Delta t$ until the TOA again reaches a W/2 value at which time the tracker's initially predicted TOA for the next pulse of the threat signal will again be restored. If, however, as illustrated in FIG. 8, a pulse of the threat signal does occur within the pulse-width of the previous pulse of the window signal waveform 8C, a predetermined point on the threat signal pulse, as for example, the leading edge of the pulse, is compared with the predicted TOA. The deviation between the predicted TOA and the arrival of the predetermined point on the pulse which, in our example, is the leading edge, are used to determine error signals which correct the phase and PRI values during the subsequent round of decrementing the predicted TOA. The effect of the correction for a phase error is shown in FIG. 8 at line D while the effect of a correction for a PRI error is shown from a comparison of the PRI values of points C and E. The effect of a correction of a PRI error is also shown at line F of waveform 8D which represents the relative PRI values of the tracker before and after the PRI correction is made at point E.

Figure 9:
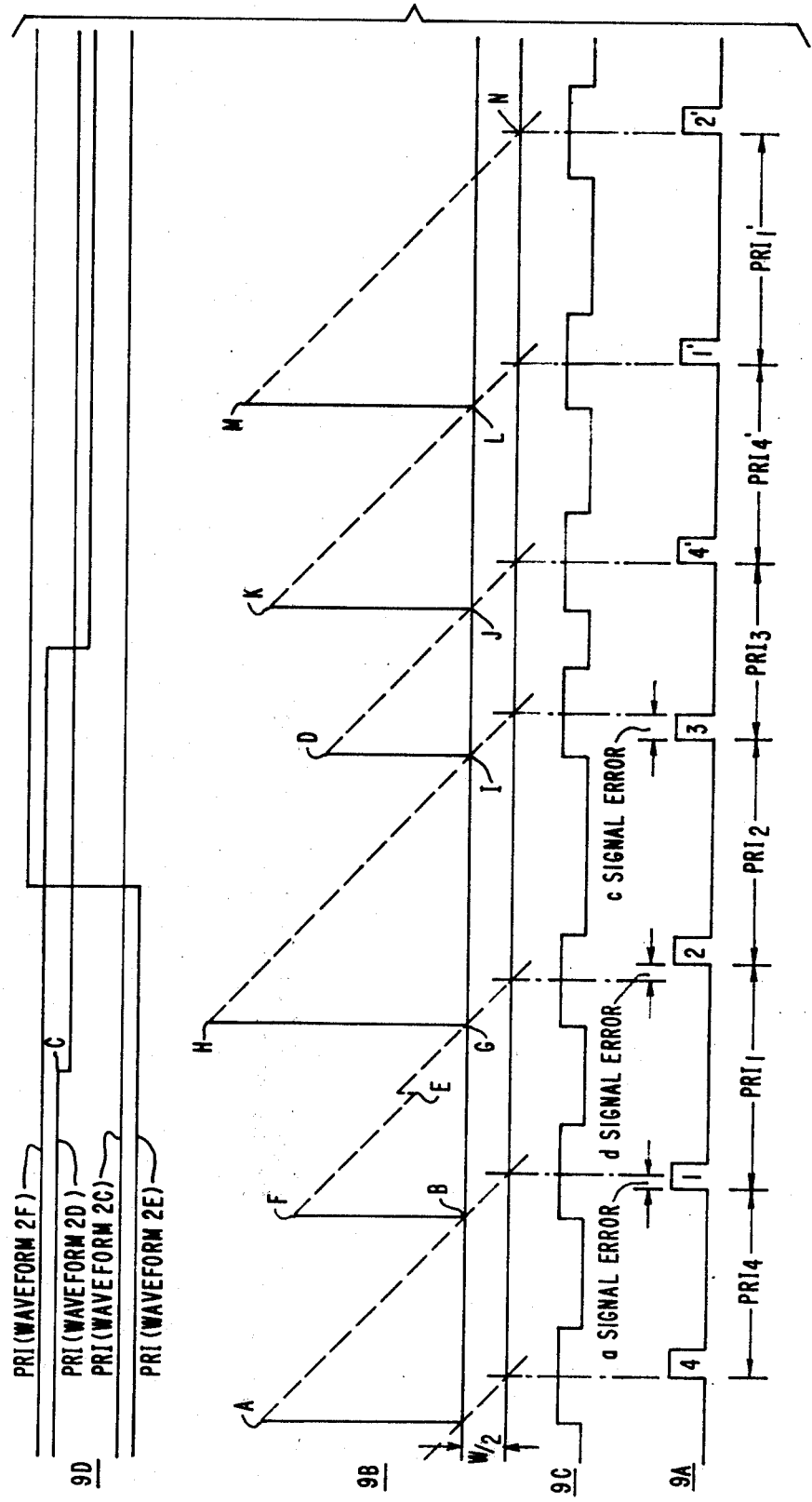
FIG. 9 illustrates the operation of the signal tracker of FIG. 1 and FIGS. 3 through 7 while tracking a pulse train having multiple beams.

The preferred embodiment of the described tracker has capabilities which transcend the requirements of a single beam threat signal. FIG. 9 illustrates the operation of the disclosed multiplexed tracker in predicting the time of arrival and RF of the four beam threat signal illustrated as waveform 2B of FIG. 2. The four beam threat signal of the waveform 2B has been redrawn in FIG. 9 as waveform 9A. As explained previously, the beams are staggered by the pulse repetition intervals $PRI_1$, $PRI_2$, $PRI_3$, and $PRI_4$. Since the beams are phase coherent, they do not shift with respect to each other but maintain their phase relationship through the progression of time. Although some values of the PRI's of the threat signal of waveform 9A are equal, this need not necessarily be the case. Persons skilled in the pertinent art generally refer to such a threat signal as having a four level stagger to indicate the number of phase coherent beams having distinct PRI and RF values which comprise the threat signal. As was the case with FIG. 8, well-known tracker acquisition apparatus and methods are used to initially determine the phase, PRI and RF relationship of the four beam threat signal of waveform 9A. As shown in waveform 9B, the PRI for the first beam is counted down between points A and B by increments of $\Delta t$. When point B is reached, the tracker begins counting down the PRI interval for the next pulse in the four beam threat signal which is a pulse of the second beam. At the same time that the countdown of the TOA for the pulse of the second beam is begun, the window signal, illustrated as the pulse waveform 9C, shows that a window is opened where the pulse predicted for the first beam of the threat signal is to be anticipated by the receiver 15. The deviation between the predicted TOA for the pulse of the first beam and the actual detection of the leading edge of the pulse of the first beam are used to determine the phase and PRI correction signals which are to be used in the prediction for the next pulse of the first beam. Waveform 9D shows that the PRI correction signal for the first beam (waveform 2D) is used to alter the PRI value for the first beam which is then stored in the PRI memory 110 and is not used again until the next predicted TOA for a pulse of the first beam is made at point K of waveform 9-B. The phase correction for the first beam, however, may be implemented during the decrementation of the PRI of the second beam because the four beams are phase coherent. This phase correction is shown to be implemented at point E of waveform 9B while the TOA of the pulse of the second beam (waveform 2E) is being decremented between points F and G. Therefore, the phase correction for the first beam is also useful to correct the phases of the second, third, and fourth beams. When point G is reached, the predetermined initial PRI value for the third beam (waveform 2F) is counted down from point H to point I. In the same manner as for the first beam, any correction in the PRI for the second beam is stored in the PRI memory 110 associated with the tracker tracking the threat signal of the waveform 9A during the decrementation of the TOA for the pulse of the third beam, while any correction for the phase of the second beam is implemented during the decrementation of the TOA for the pulse of the third beam. Similarly, when point I is reached, the TOA value for the pulse of the fourth beam (waveform 2C) of the threat signal of waveform 9A is counted down from point D to point J. In the same manner as for the second and third beams, any correction in the TOA for the fourth beam is stored in the address of the PRI memory 110 associated with the tracker tracking the threat signal of waveform 9A.

When point K is reached, the tracker calls the PRI value for the first beam from the address of the PRI memory 110 associated with the first beam of the threat signal of the waveform 9A which had been stored at point C in waveform 9D. This corrected PRI value is provided to the TOA memory 114 at the address which is associated with the tracker tracking the threat signal of waveform 9A and is decremented between points K and L. As was explained previously, any phase correction for the TOA of the first beam is implemented and a PRI correction for the first beam is stored in the appropriate memory location of the PRI memory 110. In an analogous manner, the tracker continues to track the four beams of the tracker signal of waveform 9A while constantly correcting errors in the PRI and phase predictions of the tracker.

From the foregoing explanation in relation to FIGS. 8 and 9, it will be appreciated that, even though all but one of the beams of a threat signal are absent, as, for example, where the second, third and fourth beams of waveform 9A were absent leaving only the first beam, the disclosed tracker will maintain phase coherence for all the beams of the threat signal which are phase coherent with respect to each other. Although the PRI prediction for a particular beam cannot be corrected if the pulse does not appear in the window which was provided for it, due to the phase coherence of all the beams, the phase correction of a single beam in the threat signal will provide for phase correction in all of the beams of the threat signal, thereby correcting for drift between the phase of the multiplexed tracker and the phase of the detected threat signal whenever a beam of the threat signal is detected by the receiver 15.

In accordance with the signal tracking system described in relation to FIGS. 1-9, it is shown that the beams of a threat signal will continue to be tracked once the RF and PRI parameters of the beams have been acquired by the multiplexed tracker. However, as was previously explained, the tracker depends upon the central processing unit 12 to detect threats that are to be tracked in accordance with the various signals detected by the receiver 15. More particularly, in response to the detected signals, if the central processing unit 12 makes a redundant determination of threats that are to be tracked, the tracker 10 will redundantly track the same threat and, consequently, indicate "ghost" threats, that is, threats which are not, in fact, present. Where the threat actively varies a parameter of its beams beyond the range anticipated in accordance with the stored beams of the central processing unit 12, the threat can cause the tracking system to redundantly track the same threat and thereby indicate the presence of a multiple of threats in response to the single threat which is actually present. The preferred embodiment of the present invention corrects this redundant indication of a single threat by adaptively redefining the parameters of the stored beams with respect to the corresponding parameters of the detected beams which are actually exhibited by the detected threat.

Figure 10:
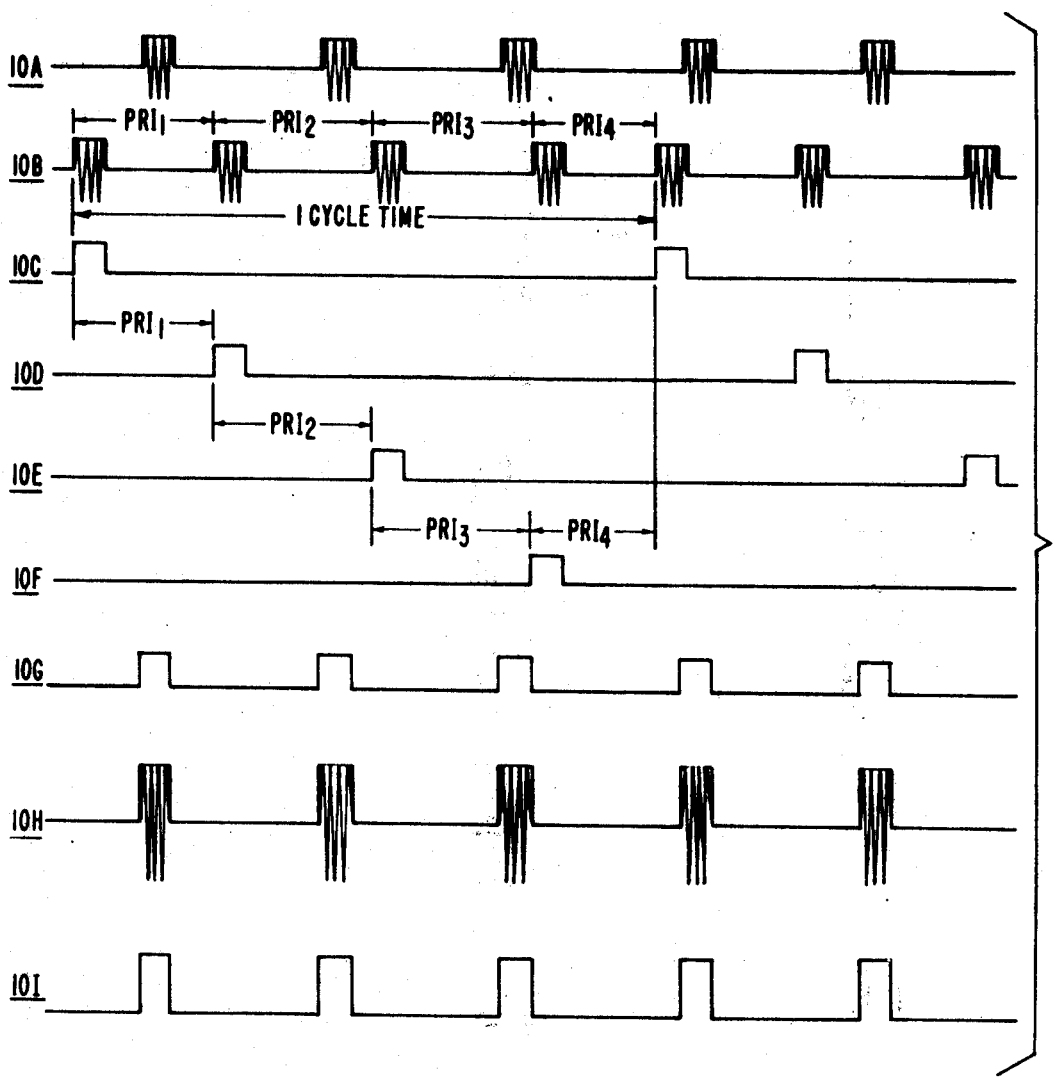
FIG. 10 represents typical waveforms which illustrate the operation of the disclosed radar system for adaptively redefining stored beam parameters associated with particular threats in response to detected beam parameters.

A particular example of the operation of the preferred embodiment in accordance with the present invention is described in relation to the waveforms shown in FIG. 10. The waveform 10A illustrates the RF excursion over time of a detected beam emanating from the signal emitter of a particular type of threat and from which the previously described tracking system will detect and track the threat. Waveform 10B illustrates the RF excursion over time of detected beams emanating from the signal emitters of another type of threat and from which the previously described tracking system will detect and track the threat. Waveform 10G represents a stored beam having parameters substantially equivalent to the detected beam of the threat signal of the waveform 10A. The central processing unit catalogs the stored beam of 10G as a stored threat of the type corresponding to the threat that transmits the signal of waveform 10A. Waveforms 10C through 10F represent the stored beams having parameters substantially equivalent to the detected beams of waveform 10B. The stored beams 10C-10F are cataloged by the central processing unit 12 as a stored threat of the type that transmits the signal of waveform 10B in accordance with pre-established information. For the example of the detected threat signals represented by waveforms 10A and 10B iof FIG. 10, the detected beam of waveform 10A has RF and PRI parameters within the limits of the RF and PRI parameters of a stored beam of waveform 10G which was previously stored in the central processing unit 12. Accordingly, the detected beam of waveform 10A is considered to be equivalent to the stored beam. Further, in accordance with the predetermined association of this stored beam and a particular threat, which association is stored in the central processing unit 12 as a stored threat, the detected beam is considered to be emanating from a threat of this particular type and the detection of one of these threats is therefore indicated. Similarly, the detected beams of the waveform 10B of FIG. 10 satisfy the RF excursion limits and the PRI of the stored beams of waveforms 10C through 10F respectively and, for the purposes of detecting a threat, are considered to be equivalent to these stored beams. Further, the central processing unit 12 determines that, in accordance with the stored threats of stored beams, the first, second, third and fourth stored beams are associated with another particular type of threat and the detection of a threat of that type is, therefore, indicated. As the detected threat signals of waveforms 10A and 10B are tracked by the radar system, the radar system is considered to be tracking the particular threats corresponding to the stored threats which the central processing unit 12 has associated with the detected beams of waveforms 10A and 10B. In other words, according to predetermined information by which particular types of threats were previously associated with stored beams, threats are detected by detecting beams that are established as being substantially equivalent to the stored beams which comprise the stored threat signals corresponding to the particular threats.

If, however, the detected beams are found to have RF or PRI values which exceed the RF and PRI excursion limits of the corresponding parameters of one stored beam, another stored beam having different PRI and RF excursion limits which would also satisfy the PRI and RF of the detected beam could additionally be established as being substantially equivalent to the detected beam. Accordingly, if the PRI or RF parameters of a detected beam are included in the PRI or RF ranges of two or more stored beams, the central processing unit 12 may determine that two or more threats corresponding to stored threats associated with these different beams or associated with some combination of these stored beams with other stored beams has been detected. Consequently, the tracking system may redundantly track the same threat or may track "ghost" threats which, in fact, are not present at all.

A specific illustration of the active control of beam parameters of a signal emitter by a threat which could cause the tracking system to detect illusory threats or to redundantly detect the same threat is illustrated by the waveforms 10A through 10I of FIG. 10. The waveform 10H represents a detected beam that is substantially similar to the detected beam of waveform 10A except that the RF excursion of the waveform 10H over a different RF range than the excursion of waveform 10A. The detected beam illustrated by the waveform 10H is therefore also substantially similar to the stored beam 10G except that the RF excursion of the waveform 10H extends beyond the range of the RF excursion of the waveform 10G. Analogous to the waveform 10A, the waveform 10H illustrates the RF excursion over time of a detected beam which has emanated from the signal emitter of a particular threat and from which the previously described tracking system will detect and track a threat corresponding to the stored threat associated with the stored beam 10G. However, due to the much broader RF excursion of the detected beam of waveform 10H, the central processing unit could associate the detected beam of waveform 10H with a multiple of the stored beams of waveform 10G located at different center frequencies. In this case the central processing unit would consequently detect a multiple of threats corresponding to the stored threat associated with the stored beam of waveform 10G.

As was previously pointed out, the deviation in RF range is the only substantial difference between the detected beams of waveforms 10A and 10H, but the detected beam of waveform 10H, in accordance with pre-established intelligence information, has a multiple of associations with the stored beam of waveform 10G located at different center frequencies, all of which are associated with a particular stored threat corresponding to the threat that transmits the waveform 10A. For each association of the detected beam 10H with a stored beam of waveform 10G located at a different center frequency, the radar system will detect a separate threat of the type corresponding to the threat signal of waveform 10A.

If the detected threat previously associated with the stored beam of waveform 10G is caused to exhibit a threat signal having an RF excursion substantially similar to the RF excursion of the detected beam 10H, the threat previously associated with stored beam 10G would be detected and indicated by the threat detection system. However, additional threats associated with the stored beam 10G at different center frequencies would also be detected and indicated by the threat detection system. Consequently, by expanding the range of its RF excursion, the threat that was previously considered to exhibit beams substantially similar to those of waveform 10G, has caused the threat detection system to also detect a multiple of other threats of a corresponding type which was associated with a beam substantially similar to the stored beam of waveform 10G when, in fact, no such additional threats are present. Therefore, unless the RF excursion of the stored beam of waveform 10G is appropriately expanded, the broader RF excursion of the detected beam of waveform 10H will cause the threat detection system to detect and track a multiple of threats corresponding to the stored threat when, in fact, only one threat actually exists. Hence, the tracking system will track the multiple of threats which are indicated by the central processing unit 12 even though all but one of these threats is illusory. That is, the radar system will redundantly detect and track a single threat as being a multiple of threats of the same type. Waveform 10I represents a stored beam having substantially the same parameters as the stored beam of waveform 10G except that the RF excursion of waveform 10I is substantially similar to the RF excursion of the detected beam of waveform 10H. It can be further seen from FIG. 10 that if the RF excursion of the beam 10I could be substituted for the RF excursion of the beam 10G, then the detected beam of waveform 10H would be substantially equivalent to only the stored beam of waveform 10I so that only one threat would be indicated as present.

It is apparent from the preceding description that, depending upon the association of the stored beams with the stored threats, changes in the parameters of beams by their respective threats could cause the threat detection system to detect threats that were completely illusory. That is, rather than the redundant detection of a threat that is actually present, active variation of the beam parameters by the threat could also cause the detection of a threat corresponding to a stored threat when no such type of threat is present at all.

The operation of the central processing unit 12 to perform the necessary modifications upon the parameters of the stored beam to eliminate the indication of redundant or illusory threats in cooperation with the apparatus described in relation to FIG. 1 and FIGS. 3 through 7 can be accomplished by the appropriate programming of the central processing unit 12. In the example of the preferred embodiment, this program first collects, in a list, all the detected threats corresponding to a particular stored threat as is further described in relation to FIG. 11. In the number of detected threats corresponding to the stored threat exceeds a predetermined value, a detailed investigation of the detected threats collected on the list is made in accordance with the flow charts of FIGS. 12-17. In this detailed investigation, in recognition that the stored beams associated with a particular stored threat may be the same stored beam associated several times, a list of the various stored beams comprising the stored threat is formed such that each of the stored beams in the list may represent one or more of the beams associated with the particular stored threat. The detected threat with the highest number of beams is identified and the detected beams of this detected threat are then compared with the detected beams of all other detected threats. In the example of the preferred embodiment, the parameter of the detected beams that is compared is the RF excursion although, by appropriate modifications to the disclosed flow charts of FIGS. 11 through 17, other characteristics such as PRI, stagger level, scan type and pulse doppler or continuous wave identification bits may be compared in a substantially similar manner. Of the detected beams that are being compared, if the parameters other than RF excursion are substantially different, the disclosed apparatus determines that the RF excursion range of the stored beam is adequate and the RF excursion of the stored beam is not changed. If the parameters other than RF excursion are substantially similar for both detected beams, the disclosed apparatus determines a new RF excursion in relation to the difference in RF excursions between the detected beams with respect to the RF excursion of the stored beam. If the new RF excursion is found to be larger than the old RF excursion, the new RF excursion is then substituted for the old RF excursion. Whenever the detected beams which are being compared are substantially identical except for RF parameters, the detected beam of the other detected threats on the list is deleted from the detected beams associated with the other detected threats. Further, if no detected beams remain for a particular detected threat, that threat is deleted from the list of detected threats. When all of the detected beams associated with the detected threats on the list have been similarly compared, the disclosed apparatus will have eliminated the redundant detection of threats and will have prevented future redundant detection of threats in response to the same detected beams by expanding the RF excursion of comparable stored beams associated with a stored threat by adaptively redefining the parameters of stored beams in response to the parameters of detected beams.

A more detailed description of the above-described operation of the central processing unit 12 is now made in relation to the flow charts of FIGS. 11 through 17. The geometric boxes of FIGS. 11 through 17 denote identifiable steps which occur during the operation of the disclosed apparatus and, furthermore, the geometric configuration of these boxes, has, in itself, significance. Specifically, an oval shaped box such as shown at step 300, indicates the initiation or completion of the operation; the hexagonally shaped box, as shown at step 334, indicates the performance of a subroutine; the rectangular box, as shown at step 302, indicates the performance of a type of information processing; and the diamond shaped box, as indicated at step 306, denotes that a decision is to be made. In the detailed operation of the present invention, the flow chart in FIG. 11 starts at step 300 in which the executive program which controls the overall operation of the central processing unit 12 initiates the operation of the present invention after which the central processing unit 12 proceeds to step 302 at which the stored beams, the stored threats, and the detected threats are placed in a dedicated memory. At step 304 a counter, which serves as a clock to control the elapsed time between successive operations of the present invention, is incremented to determine whether sufficient time has elapsed for the parameters of the stored, or predetermined beams to be adaptively compared in relation to the beams detected by the receiver 15. At step 306, the decision is made as to whether the counter which was incremented at step 304 indicates that sufficient time has elapsed since the last check of the stored beam parameters and, if it is not time for the stored beam check, the operation of the central processing unit 12 is returned to the executive program at step 308. If sufficient time has elapsed since the last stored beam check, the counter which was incremented at step 304 is returned to zero from which it will begin counting to measure the time at which the subsequent stored beam check will be performed.

When it has been determined at step 306 that the stored threat signal is to be checked, the stored threat is addressed from the stored threat table at step 312 and, at step 314, the central processing unit decides whether the stored threat table has been completed. If the stored threat table has been completed, step 315 sets up the central processing unit to start at the beginning of the stored threat table the next time the decision at step 306 indicates that the stored threat signal is to be checked. Then, at step 316 the decision is made as to whether a wait signal, whose purpose is further explained in relation to FIG. 12, has been set.

If it is determined at step 316 that the wait signal is not set, the wait signal is then set at step 317 and the operation of the central processing unit returns to step 312 to address the next stored threat on the stored threat table. If it is determined at step 316 that the wait signal is set, the central processing unit returns to step 304 at which the operation of the central processing unit with regard to the adaptive regulation of the stored beams is interrupted for the time determined by the timing counter. The wait signal decision at step 316 is therefore a control to prevent the dedication of the central processing unit to the performance of the operation of the present invention for an extended period of time without interruption for other functions of the processing unit which are dictated by the executive program. Further, it will be seen that the step 317, which sets the wait signal if it is determined at step 316 that no wait signal is set, will prevent more than two complete examinations of the stored threats of the stored threat table before there is an interruption of the operation of the central processing unit.

If the decision of step 314 is that all the stored threats of the stored threat table have not been examined, the central processing unit at step 318 attaches an identification to the stored threat as "A threat". Then at step 319, the first detected threat of the detected threat table is addressed and identified as "B threat". At this point, the stored threat of the stored threat table has been identified as "A threat" and the detected threat of the detected threat table has been identified as "B threat".

Step 320 is to decide whether the detected threat which has been addressed and identified as "B threat" is valid and is not the consequence of an error in the operation of the central processing unit. If step 320 determines that the detected threat which has been identified as "B threat" is invalid, step 322 determines whether all of the detected threats have been checked. When it has been determined at step 322 that all the detected threats have not been checked, step 324 addresses the next detected threat in the detected threat list and identifies this detected threat as "B threat". The operation of the central processing unit then returns to step 320 to determine whether the new "B threat" is a valid detected threat. If it is determined at step 320 that "B threat" is a valid detected threat, step 326 determines whether "B threat" is essentially equal to "A threat". In other words, steps 326 compares the stored threat which was identified as "A threat" at step 318 with the detected threat which was identified as "B threat" at step 319.

If "B threat" is determined to be essentially equal to "A threat" at step 326, the central processing unit stores at step 328 the number of beams and the address of "B threat" in a memory which is dedicated to the retention of all detected threats which are found substantially equal to a particular stored threat which in this case is "A threat". In the description of FIGS. 11 through 17, the memory which is dedicated to the retention of the detected threats is referred to "A list". At step 330, the central processing unit increments the count of the detected threats added to A list.

Where it is determined at step 326 that "B threat" is not substantially equal to "A threat", the central processing unit operation is directed to step 322 to determine whether all the detected threats in the detected threat list have been checked. The central processing unit operation is also directed to step 322 to determine whether all the detected threats in the detected list have been checked after the count of the detected threats is incremented at step 330. It is shown, therefore, that in accordance with the description of the steps 320 through 330 all of the detected threats on the detected threat list will eventually be compared at step 326 with a particular stored threat which is identified as "A threat" at step 318.

When step 322 determines that all of the detected threats on the detected threat list have been checked, the central processing unit operation moves to step 332 to determine whether the count of the number of "B threats" which are essentially equal to "A threat" as determined at step 330 exceeds a pedetermined limit. If the number of "B threats" which were found to be substantially equal to "A threat" does not exceed the predetermined limit established at step 332, the central processing unit returns to step 312 from which it subsequently operates to compare the next stored threat on the stored threat table with all of the detected threats to determine whether the number of detected threats which are substantially equal to the stored threat exceeds a predetermined limit in accordance with the operation of steps 312 through 332 as previously described. When the "A threat" count does not exceed the predetermined limit, the excursion ranges of the stored beam characteristics are considered to adequately describe the true characteristics of the detected beams and the excursion ranges of the stored beam characteristics are not adaptively regulated in accordance with the excursion ranges of detected beams. If, however, step 332 determines that the "A threat" count exceeds a predetermined limit, step 334 further interrogates the stored beams associated with "A threat" and adaptively regulates these stored beams in accordance with the beams associated with the detected "B threats" which were stored in "A list" at step 328. The details of step 334, which, for the example of the preferred embodiment determines whether the RF excursion of the stored beams should be expanded, are further described in relation to FIGS. 12 through 17. After the stored beams which comprise "A threat" have been interrogated and adaptively regulated at step 334, a wait signal is set at 336 which serves to interrupt the operation of the central processing unit with regard to the comparison of detected threats with stored threats and the interrogation and adaptive regulation of stored beams in accordance with detected beams for a predetermined time to permit the operation of the central processing unit to be directed to other purposes as dictated by the executive program as previously described.

Figure 11:
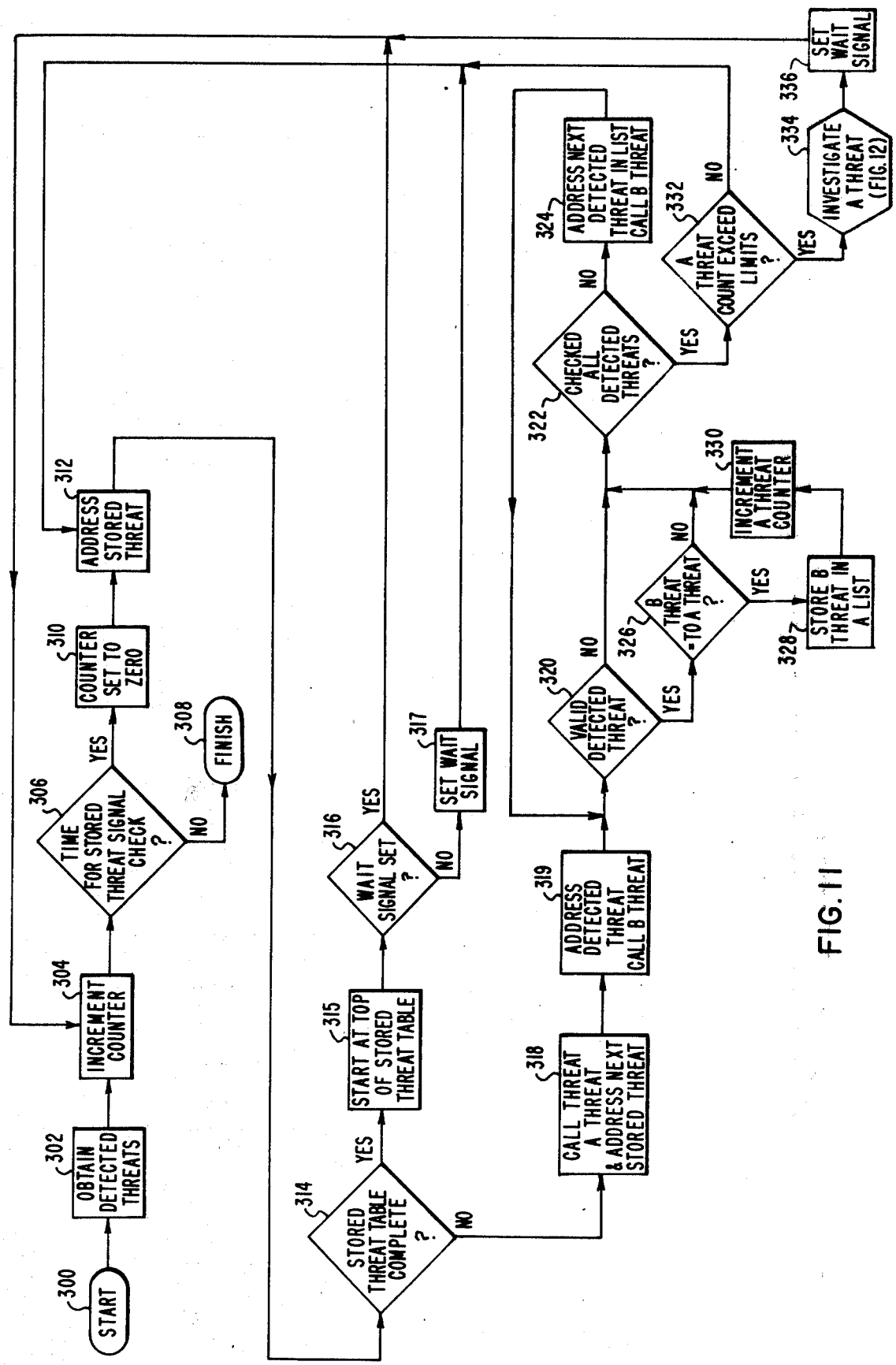
FIG. 11 is a flow chart illustrating the entrance of the operation of the central processing unit to an adaptive mode and the operation of the central processing unit in collecting all the detected threats which correspond to a single stored threat.

The interrogation of the beams associated with "A threat" and their adaptive regulation in accordance with the parameters of detected beams as indicated at step 334 of FIG. 11 is further described in relation to FIG. 12. The interrogation of the stored beams begins at step 338 and at step 340 the stored beams and their correlative identification numbers associated with "A threat" are collected. This operation of the central processing unit is performed in accordance with a subroutine which is further described in relation to FIG. 13. After the stored beams are collected at step 340, step 342 determines the detected threat in "A list" having the highest number of beams and identifies this threat as "T threat". Step 342 thereby locates the detected threat which has the highest probability of accurately representing an actual threat since there are more types of beams for this detected threat that correspond to beams associated with the stored threat than for other detected threats. It is advantageous to examine this threat first since the operation of the central processing unit in examining all the threats may be interrupted before the examination of all the threats is completed. If the detected threat having the most beams is examined first, the central processing unit will examine more detected beams before its operation is interrupted, thereby improving the fidelity of the adaptive regulation of the stored beams. A more detailed description of the search of "A list" for the detected threat with the highest number of beams is further described in relation to FIG. 14. Step 344 of FIG. 12 indicates that the central processing unit next addresses the first beam of "T threat" and step 346 determines whether the beam data constitutes a valid entry as opposed to some erroneous information. If the beam is not a valid entry as determined by step 346, step 348 determines whether any beams remain in "T threat". If beams do remain in "T threat" step 350 operates to address the next beam in "T threat" and the operation of the central processing unit returns to step 346 which decides whether this subsequent beam constitutes a valid entry. If it is determined at step 348 that there are no more beams in "T threat", step 352 determines whether at least two threats are contained in "A list". If "A list" does not contain at least two threats, there is no need for adaptive regulation of the stored beams associated with the stored threat since there is only one detected threat for the particular stored threat and, at step 353, the operation of the central processing unit is returned to the flow chart of FIG. 11 at step 336. If, however, it is determined at step 352 of FIG. 12 that there are at least two threats in "A list" one of these detected threats may be redundant or illusory and the parameters of the beams comprising this detected threat must be compared with the parameters of the stored beams comprising the stored threat to adaptively regulate the excursion ranges of the stored beam parameters if it is found that at least one of the detected threats is redundant or illusory. Accordingly, at step 354 the central processing unit decrements the count of the number of detected threats in "A list", deletes the present "T threat" from the detected threats listed in "A list" and returns to step 342 to identify the detected threat now having the most beams after the deletion of the detected threat which was previously found to have the highest number of beams and identify this threat as "T threat".

If it is found at step 346 that the beam data comprises a valid entry, step 356 indicates that the present invention collects the identification number and address of "T beam". Step 358 obtains all of the identification numbers associated with "T beam" for every beam associated at step 342 with the detected threat identified as "T threat". This collection of identification numbers representing the number of times "T beam" occurs in "T threat" is further described in relation to FIG. 15. At step 360, the first detected threat in "A list" which was compiled at step 328 of FIG. 11, is addressed. At step 362 the decision is made as to whether this first detected threat is valid. If it is decided at step 362 that the first detected threat is not valid, the central processing unit decides at 364 whether any more threats are included in "A list". If it is determined at step 364 that, in addition to the threat which has been found to be invalid at step 362, there exists other threats on "A list", the central processing unit at step 365 addresses the next threat on "A list" and returns to step 362 to determine whether this next threat is valid. If step 362 determines that the detected threat of "A list" is valid, the central processing unit at step 366 identifies this detected threat of "A list" as "P threat" and identifies the beams which comprise this threat as "P beams". At step 367 the central processing unit addresses the first beam in "P threat", that is, the central processing unit addresses the first "P beam" of "P threat", and at step 368 the central processing unit determines whether this "P beam" is valid. If it is determined at step 368 that the "P beam" is not valid, step 370 decides whether any more "P beams" remain in "P threat". If no more "P beams" remain, the operation returns to step 364 where it is determined whether any more threats are included in "A list". If, however, at step 370 it is determined that there are more "P beams" in "P threat", the operation moves to step 372 which addresses the next "P beam" in "P threat" after which the operation returns to step 368 to determine whether the "P beam" is valid. Where it is determined at step 368 that valid "P beam" exists, step 374 stores the "P beam" identification number and address. Step 376 avoids a comparison of a beam which has been identified as "P beam" with the same beam which has also been identified as "T beam" by determining whether the beam address of "P beam" is equal to the beam address of "T beam". When the address of "P beam" is the same as the address of "T beam", the operation of the central processing unit returns to step 370 to determine whether any more "P beams" exist in "P threat". If it is found that a beam which has been identified as "P beam" and also identified as "T beam" is not being compared with itself, step 378 determines whether the "P beam" represents the same stored beam as the "T beam" by comparing the identification numbers of the "P beam" and the "T beam".

The identification numbers associated with the beams which are, in the course of the operation of the central processing unit, designated as "P beams" or "T beams", identify the parameters of the beams. If the "P beams" and the "T beams" have the same identification numbers, they represent the same stored beam which has been interpreted as being incorporated in the respective "P beam" and "T beam" of the "P threat" and "T threat". Conversely, where the "P beam" and "T beam" do not have the same identification numbers, their parameters are dissimilar and they do not represent the same stored beam which has been used to comprise both the "P threat" and "T threat". When the central processing unit decides, at step 378, that the identification numbers of the "P beam" and the "T beam" are not substantially equal, step 382 determines whether there are any more identification numbers associated with "T beam". If there are more identification numbers associated with "T beam", the operation of the central processing unit returns to step 378 to compare the identification number associated with "P beam" with the second identification number associated with the "T beam". When all the identification numbers of "T beam" have been compared with the identification number of the "P beam" at step 378, step 382 determines that there are no more identification numbers associated with "T beam" and the operation of the central processing unit returns to step 370 to determine whether there are any more "P beams" associated with the "P threat" whose beams are presently being compared with the beams of "T threat". If, at step 378, it is determined that the identification number of "P beam" is substantially equal to the identification number of "T beam", the operation of the central processing unit proceeds to step 384 to check whether the pulse repetition interval of "T beam" is substantially equal to the pulse repetition interval of "P beam", the stagger level of "T beam" is substantially equal to the stagger level of "P beam", and the pulse doppler and continuous wave bits of the "T beam" are substantially equal to the pulse doppler and continuous wave bits for the "T beam". The operation of the central processing unit in matching the pulse repetition interval, stagger level, and pulse doppler and continuous wave bits for the "T beam" and the "P beam" is more particularly described in relation to FIG. 16. The important consequence of step 384 in matching the "T beam" data with the "P beam" data is that if the parameters of the "T beam" and the "P beam" are substantially equal except for the magnitude of their RF excursions, the beams represented will be considered to be beams of a single threat in the environment which has a wider radio frequency excursion than the beam stored in the central processing unit. In accordance with the foregoing description, steps 300 through 384 of FIGS. 11 and 12, as further explained in FIGS. 13 through 16, provide a means for comparing the detected beams of a predetermined number of detected threat signals corresponding to a selected one of the stored threat signals to determine whether a selected parameter of the detected beams is substantially different at times when the other parameters of the detected beams are substantially the same.

At step 386, the decision is made as to whether the data of "T beam" and "P beam" matched. If the data did not match, the beams represented by "T beam" and "P beam" have other dissimilar parameters in addition to their RF excursion limits and will therefore be considered to be associated with physically distinct threats. In this case, the operation of the central processing unit returns to step 370 to determine whether there are any more "P beams" in "P threat" and, if such beams exist, to examine these beams in accordance with the operation previously described in steps 368 through 386. If, however, the parameters of the "T beams" were found to match the parameters of the "P beam", the operation of the central processing unit proceeds to step 388 which determines the absolute value of the difference of the RF excursions of the "T beam" and the "P beam" and, from this absolute value subtracts the former RF excursion value of the stored beam previously associated with the stored threat which was addressed at step 312 of FIG. 11. Accordingly, step 388 of FIG. 12 provides a means for determining a new range for the selected parameter if the parameter of the detected beam is substantially different at times when the other parameters of the detected beams are substantially the same, said new range being determined in response to the ranges of the selected parameter for the beams that are being compared and in response to the range of the selected parameter for the stored beam of the stored threat that is comparable to the detected beams. At step 390, the central processing unit determines whether the new RF excursion which was determined at the previously described step 388 is larger than the old RF excursion. If the new RF excursion is larger, it is substituted for the old RF excursion at step 392. Accordingly, steps 390 and 392 of FIG. 12 provide a means for substituting the new range of the selected parameter for a previously determined range when the new range exceeds the previously determined range. If the new RF excursion is not larger than the old RF excursion, or after substituting the new RF excursion which was larger at step 392, "P beam" is deleted from the beams which are associated with "P threat" at step 394. Proceeding to step 396, the operation of the central processing unit is to delete "P beam" from the table of detected beams in accordance with an operation which is hereafter more particularly defined in relation to FIG. 17. At step 400, the central processing unit decrements the number of beams in "P threat" and at step 402, determines whether any beams remain in "P threat". If it is determined at step 402 that there are no beams left in "P threat", the central processing unit, at step 404, removes "P threat" from "A list" and decrements the number of threats in "A list". If it is determined at step 402 that beams still remain in "P threat", or, alternatively, if it is determined that no beams remain in "P threat" and "P threat" is deleted from "A list" at step 404, the operation of the central processing unit returns to step 370 to determine whether any more "P beams" remain in "P threat" as was similarly explained with relation to step 382 where it was determined that no more identification numbers were associated with "T beam", and also at step 386 where it was determined that the parameters of "T beam" did not substantially match the parameters of "P beam". Steps 394 through 404 therefore provide a means for deleting one of the detected beams from its respective detected threat if the parameter of the detected beam is substantially different at times when the other parameters of the detected beams are substantially the same, and for deleting the detected threat if all the detected beams of the detected threat have been deleted, and for deleting the one of the detected beams from the beams detected by the detecting means.

Where it is determined at step 370 that more "P beams" still remain, the operation of the central processing unit proceeds as was described above in relation to steps 370 through 404 to determine whether the detected beams which are associated with "T threat" can also be characterized as beams of "P threat" whose RF excursion is expanded. If it is determined at step 370 that there are no more "P beams", and it is determined at step 364 that more threats remain on "A list", the operation of the central processing unit proceeds through steps 362 to 404 as was previously described to determine whether the beams which are associated with these additional threats differ from the beams associated with "T threat" by only their RF excursion and, therefore, can be considered to be equivalent to a single beam with an expanded RF excursion value. After the "T beam" of "T threat" has been compared to all the "P beams" of all the "P threats" on "A list" as determined by the operation of the central processing unit at step 364, the central processing unit will determine whether a change in the RF excursion of the "T beam" of "T threat" is indicated by the calculation of a new RF excursion at step 388 and the comparison of the new RF excursion with the old RF excursion at step 390. If no change in the RF excursion of the "T beam" is indicated at step 406, the central processing unit returns to step 348 of FIG. 12 and proceeds to analyze the remaining "T beams" of "T threat" in accordance with the operation of the central processing unit as described in relation to steps 346 through 404. Therefore, each beam which comprises a "T beam" in the "T threat" will be analyzed by a comparison of the characteristics of that beam with the parameters or characteristics, of all other beams of all other detected threats included on "A list" and where the parameters of these other beams are substantially similar to the parameters of the beams of the "T beam" of "T threat", the other beams of other detected threats on "A list" are deleted and the RF excursion parameter of "T beam" appropriately expanded where it appears that these beams differ in only their RF characteristic.

Where it is determined at step 406 that a new RF is to replace the old RF in accordance with steps 388, 390, and 392, the operation of the central processing unit at step 408 adds the new RF excursion to each stored beam of A threat that requires an RF excursion change. Then, as with step 406 in the case where no RF substitutions are made in A threat, the operation of the central processing unit returns to step 348 to determine whether any other beams remain in "threat" and proceeds to similarly compare the remaining beams of "T threat" with the beams of other threats on "A list" to detect beams whose parameters other than RF excursion are substantially equal, to delete those other beams of other threats on "A list", and to appropriately expand the RF excursion of the stored beam which corresponds to the beam of "T threat" which is under consideration.

As previously explained, when all of the beams of "T threat" have been compared with all of the beams of the remaining threats on "A list" the operation of the central processing unit determines whether at least two threats still exist in "A list" and, if so, deletes "T threat" from "A list" and proceeds to analyze the threat having the next highest number of beams in accordance with the operation described in steps 342 through 408. As also described previously, when it is determined at step 352 that only one threat remains in "A list", all of the beams of each threat have, at one point, been compared with the parameters of the beams of the other threats of "A list" unless the beam associated with a threat having a lower number of beams was previously found to have parameters substantially equal to the parameters of a beam associated with a threat having a higher number of beams in which case, the beam of the threat having the lower number of beams was deleted. When it is determined at step 352 that only one threat remains in "A list", no further comparisons between beams of different threats of "A list" can be made and the operation of the central processing unit returns to step 336 of FIG. 11 as was previously explained. Therefore, steps 406 and 408 of FIG. 12 comprise a means for adding the new range for the selected parameter to the range of the selected parameter of each stored beam associated with the selected stored threat if the new range for the selected parameter exceeds the range of the selected parameter of each stored beam to adaptively redefine the range of the selected parameter of the stored beams of the stored threat in response to the range of the selected parameter of the detected beams of the detected threats corresponding to the stored threat.

FIG. 13 is a more detailed description of the operation of the central processing unit which was previously described at step 340 of FIG. 12 in which the stored beams and their associated identification numbers of "A threat" are collected. In FIG. 13, the set of stored beams that are associated with a stored threat may be the same stored beam listed a multiple of times. Therefore, the operation of the flow chart in FIG. 13 sorts out the different stored beams that are associated with a particular stored threat.

The initiation of the operation of the flow chart shown in FIG. 13 begins at step 412 and at step 414 the central processing unit addresses the stored "A threat" and saves the number of stored beams and their associated identification numbers. At step 416, the central processing unit addresses the first beam in "A threat" and at step 418, obtains the identification number associated with this beam. Step 420 determines whether this stored beam has previously been saved. If step 420 determines that the stored beam has not previously been saved, step 422 saves the stored beam and its associated identification number, but if step 420 determines that the stored beam has been previously saved, step 424 operates to add the new identification number to the stored beam which is already represented. The central processing unit proceeds from step 422 or from step 424, as the case may be, to step 426 at which the central processing unit addresses the next beam in "A threat". The operation then proceeds to step 428 where it is decided whether any more stored beams remain in "A threat". If more stored beams remain, the operation returns to step 418 and, in accordance with the operation described in relation to steps 418 through 428, the central processing unit saves the beams and their associated identification numbers when such beams have not been previously stored and, when such beams have been previously stored, adds the new identification number associated with the stored beam already represented. When step 428 determines that no more stored beams exist in "A threat", step 430 indicates that the operation of the central processing unit returns to step 342 of the flow chart described in FIG. 12. Accordingly, it is shown that the operation of the flow chart of FIG. 13 is to list each distinct stored beam which is contained in "A threat" and to associate with each distinct beam the identification number associated with each occurrence of that beam in "A threat". The flow chart of FIG. 13 therefore serves to eliminate duplicity in the representation of stored beams in "A threat".

The flow chart shown in FIG. 14 describes in greater detail the operation of the central processing unit in performing the step 342 of the flow chart of FIG. 12 in which the detected threat on "A list" having the highest number of detected beams was identified as "T threat". In FIG. 14, the operation of the central processing unit in identifying "T threat" is initiated at step 432 and at step 434 addresses the first detected threat in "A list". At step 436, the central processing unit determines whether this detected threat is a valid entry. If the detected threat is determined not to be a valid entry at step 436, the central processing unit addresses the next detected threat in "A list" at step 438. However, if the detected threat is found to be a valid entry at step 436, step 440 saves the total number of beams contained in the threat and step 442 determines whether this number is the highest number of detected beams obtained thus far for detected threats in "A list". If this total number of detected threats is not the highest number obtained thus far, the central processing unit proceeds to step 438 to address the next detected threat in "A list". However, if the detected threat is found to have the highest number of beams of any detected threat thus far examined in "A list", the address of this threat is stored at step 444 before the operation of the central processing unit proceeds to step 438 to address the next detected threat in "A list". Step 446 determines whether any more detected threats remain in "A list". If more detected threats do remain, the validity of these entries is examined at step 436 and they are dealt with in accordance with the operation previously explained in relation to steps 436 through 444. If, at step 446, it is found that no more detected threats remain in "A list", step 448 identifies the threat with the highest number of beams as "T threat" and the operation of the central processing unit returns to step 344 of FIG. 12 as indicated by step 450 of FIG. 14. Thus, it will be seen that in accordance with the operation of the flow chart of FIG. 14, the central processing unit chooses the detected threat contained on "A list" which has the highest number of beams and identifies this threat as "T threat".

FIG. 15 shows a flow chart which further describes the operation of the central processing unit in collecting the identification numbers representing "T beam" which was described at step 358 of FIG. 12. The operation of the flow chart of FIG. 15 is initiated at step 452 after which the stored beam of "A threat" is addressed at step 454. At step 456, the central processing unit finds the stored beams in "A threat" which have the same identification number as "T beam". Then at step 458 all the identification numbers of the stored beam are saved along with the total number of identification numbers associated with this beam and the operation of the central processing unit is returned to step 360 of the flow chart of FIG. 12 as indicated by step 460 in FIG. 15.

FIG. 16 illustrates a more detailed description of the operation of the central processing unit in matching the "T beam" data and "P beam" data as previously discussed in relation to step 384 of FIG. 12. The operation of the flow chart of FIG. 16 is initiated at step 462 and at step 464 the central processing unit records the pulse repetition interval (PRI), stagger level, scan bits, pulse doppler and continuous wave bits of "T beam". At step 466, the central processing unit decides whether the RF scan of "T beam" is substantially equal to the RF scan of "P beam". If the scan of "T beam" is not substantially equal to the RF scan of "P beam", a scan fail flag is set at step 468. If the RF scans of "P beam" and "T beam" are not substantially equal, the scan fail flag is not set. Whether the scan fail flag is set or not, the operation of the central processing unit proceeds to step 470 to determine whether the PRI of the beams is substantially equal. If the PRI is not substantially equal, the central processing unit determines that the beams do not match at step 472. However, if the PRI of "T beam" and "P beam" are found to be substantially equal, the central processing unit proceeds to step 474 to determine whether the beams also have a stagger level which is substantially equal. If the beams do not have a stagger level which is substantially equal, the operation of the central processing unit proceeds to step 472 to indicate that the beams do not match. However, if the stagger levels of the beams are found to be substantially equal, the central processing unit proceeds to step 476 to determine whether the scan fail flag was set at step 468. If the scan fail flag is set, step 478 determines whether the pulse doppler and continuous wave of "T beam" is substantially equal to the pulse doppler and continuous wave of "P beam". If the pulse doppler and continuous wave bits are not substantially equal, the central processing unit then returns to step 472 to indicate that the beams do not match. However, if the pulse doppler and continuous wave bits of the beams are found to be substantially equal, the central processing unit will indicate that the beams match at step 480. If at step 476, it was determined that the scan fail flag was not set, the central processing unit determines whether the scan failed in "P beam" at step 482. A scan failure in "P beam" will not deter the central processing unit from accepting a beam match. If the scan did fail in "P beam", the operation of the central processing unit returns to step 478 to determine whether the pulse doppler and continuous wave bits of the beams are substantially equal and then proceeds either to step 472 or step 480 in accordance with that decision as was previously described. If it was determined at step 482 that the scan did not fail in "P beam" nor in "T beam", the operation of the central processing unit determines whether the RF scan, pulse doppler and continuous wave bits of "T beam" are substantially equal to the RF scan, pulse doppler, and continuous wave bits of "P beam" at step 484. If the RF scan, pulse doppler and continuous wave bits of both beams are not substantially equal as determined at step 484, the central processing unit proceeds to step 472 to indicate that the beams do not match. However, if the RF scan, pulse doppler and continuous wave bits for both beams were found to be equal at step 484, the central processing unit proceeds to step 480 to indicate that the beams do match. After an indication at 472 that the beams do not match or at indication at step 480 that the beams do match, the flow chart shown in FIG. 16 returns to step 386 of FIG. 12 as indicated at step 486 of FIG. 16.

FIG. 17 shows a flow chart which describes in greater detail the operation of the central processing unit in deleting "P beam" from the detected beam table as previously described in relation to step 396 of FIG. 12. After the initiation of the operation of the central processing unit at step 488, the central processing unit addresses the beginning of the detected beam table at step 490 and subtracts a digital one from the detected beam address at step 492. At step 494, the address which was determined by the subtraction operation of step 492 is stored and at step 496 the address of the next detected beam on the detected beam table is collected. The operation of the central processing unit then proceeds to step 502 which saves the address of the next beam on the table. At step 504 the determination is made as to whether this address is the address of "P beam". If the address is not the "P beam" address, the operation of the central processing unit returns to step 494 and proceeds as previously described in relation to steps 494 through 504. Once the address of the "P beam" is found, the operation proceeds to step 508 at which the central processing unit replaces the address of the next detected beam of the signal preceding "P beam" with the address of the next detected beam succeeding "P beam". Therefore, in subsequent operation of the flow chart of FIG. 17, the operation of the central processing unit will be directed from the address of the beam which precedes "P beam" directly to the address of the beam which follows "P beam" so that "P beam" is not addressed by the central processing unit. After this rearrangement in the order of succession of the beams of the stored beam table in accordance with step 508, the flow chart of FIG. 17 returns to step 400 of FIG. 12 as indicated by step 510 of FIG. 17.

As was previously explained in relation to FIGS. 3 through 9, the radar system herein disclosed includes a tracker which is capable of tracking signals of multiple stagger levels or beams. That is, the signal has a multiple of pulse repetition intervals which occur in a predictable successive order thereby providing a pulse pattern which repeats over a predetermined cycle time. If, during the above described operation of the radar system, one or more beams of the signal which is being tracked are lost, the tracker prediction windows for the pulses of these beams will contain only a few random pulses so that the tracker will determine that the threat signal is no longer being tracked. Also, if another signal having substantially the same pulse repetition intervals and cycle time which result is substantially the same pulse pattern appears as a substitute for the signal that was previously tracked, the tracker will determine that the previous threat signal is no longer being tracked, if the substituted signal is of a substantially different radio frequency, and the tracker will lose track of the substituted signal. In addition, however, the tracker which comprises the preferred embodiment of the present invention performs a tracker verification operation in which the radar system is capable of detecting the substitution of a second signal for the threat signal which was previously tracked where the second signal has similar parameters to the previous threat signal except that the substituted signal includes at least one additional beam.

One example of the operation of the radar system in performing the tracker verification operation in accordance with the preferred embodiment of the present invention is illustrated in FIG. 18. FIG. 18 includes three waveforms which illustrate the frequency of detected threat signals versus time. More particularly, waveform 18A is a three beam threat signal and waveform 18B is a four beam threat signal in which three of the beams are identical to the three beams of waveform 18A. The fourth beam of the waveform 18B is separately set out in waveform 18C where it is seen that the pulses of waveform 18C are separated by a time period which is substantially identical to the cycle time of the waveform 18A. Assuming that, previous to the tracker verification operation, the above described tracker has been tracking the waveform 18A, and assuming further, that waveform 18B has moved through the waveform 18A at a low beat frequency such that it has been substituted for waveform 18A. As was noted earlier in this description of the preferred embodiment, the radar system will track the waveform 18B as though it were the waveform 18A. Upon the implementation of the tracker verification operation by the central processing unit 12, the receiver 15 detects all the pulses incident upon the antenna 14 for a predetermined dwell period. The pulses of the beams in the original threat signal are blanked out by the verify command network 105 and are not stored in the buffer memory 52. The remaining pulses are then sorted to determine whether any more beams which are phase coherent with the beams of the original threat signal are present. If no phase coherent beams are found, then the threat signal which is being tracked is considered to be the original threat signal. However, if phase coherent beams are found to be present among the remaining pulses received during the dwell period, the determination is made that another threat signal has been substituted for the original threat signal. Accordingly, the tracker is turned off and restarted to reacquire and track the original threat signal or some other threat signal as dictated by the central processing unit 12. For the specific example of the waveforms shown in FIG. 18, the first, second and fourth beams will be blanked from the buffer memory 52 by the verify command network 104 thereby leaving the third beam to be sorted from the detected pulses by the central processing unit 12. When the third beam is detected, and recognized as having pulses that are separated by a time substantially equal to the cycle time of the waveform 18A, it is determined by the central processing unit 12, as more particularly described in FIG. 19 that the tracker is now tracking the substituted threat signal of waveform 18-B and is no longer tracking the original threat signal of waveform 18A. Upon making this determination, the central processing unit 12 will cause the tracker to be restarted to track the substituted signal, to track the threat signal which was originally being tracked, or to track some other signal in accordance with the PRI and RF values provided to the tracker by the central processing unit 12.

The central processing unit 12 cooperates with the apparatus described in FIGS. 1 through 9 as follows to perform the tracker verification operation which determines whether a substituted signal is being tracked in place of a threat signal that was previously tracked. The operation of the central processing unit 12 is more particularly described in relation to the flow chart of FIG. 19 which describes the operation of the central processing unit 12 during the tracker verification operation. At step 512 central processing unit 12 initiates the tracker verification operation which is to be implemented at predetermined increments of time for each active tracker. The central processing unit determines whether the predetermined time for the tracker verification operation has elapsed at step 514 and if insufficient time has elapsed, the central processing unit 12 returns to operation as commanded by its executive program as indicated by step 516 in FIG. 19. If it is determined at step 514 that sufficient time has passed since the last tracker verification operation and that a new tracker verification to be initiated, the central processing unit 12 obtains the data of the threat which is being tracked at step 518. At step 520, it is determined whether the tracker for which data is to be obtained is active and, if the tracker is currently inactive, the operation of the central processing unit 12 is directed to step 516. If, however, the tracker is found to be active, the central processing unit 12 provides a tracker verification signal to the highest memory 186 of the tracker priority logic 168, and also commands the receiver 15 to dwell at the RF frequency of the signal as illustrated at step 522. As previously explained in relation to FIG. 5, the highest memory 186 is responsive to the tracker verification signal of the central processing unit 12 to provide overriding priority to the tracker which is tracking the threat signal that is being verified. During the tracker verification operation, the central processing unit 12 provides a tracker verification signal to the highest memory 186. In response to the tracker verification signal from the central processing unit 12, the highest memory 186 sets the most significant bit in the hold register 176 such that priority value for this tracker is higher than any priority value which can be obtained from the priority memory 172 in the normal operation of the tracker priority logic 168. Thereafter, the tracker priority logic 168 operates such that the priority of the tracker that is tracking the threat signal being verified will always be the highest priority among trackers and, therefore, the tracker that is tracking the threat signal that is being verified will always get a window in response to a There signal while other trackers will not get a window as long as the tracker verification signal is present. Accordingly, as pulses are detected by the receiver during the period of the dwell, those pulses that are considered to be pulses of the originally tracked signal as a consequence of their RF and TOA characteristics are blanked out of the set of detected pulses. That is, the pulses which are considered to be pulses of the original signal are not stored in the buffer memory 52 even though they are detected by the receiver 15 because the tracker which is being verified controls the highest memory 186. However, all other pulses detected by the receiver 15 during the period of the dwell are stored in the buffer memory 52.

In accordance with the above description, it is shown that steps 512 through 522 of FIG. 19 are included in a means for directing the detecting means to detect all intercepted signal occurring within a predetermined time and having frequencies substantially equal to a predetermined frequency. It is also shown that step 522 further provides means for blanking pulses corresponding to the pulses of the particular threat signal detected by said detecting means in response to the control of said tracker.

The central processing unit 12 determines whether the tracker is tracking the original threat signal as indicated by step 524 in FIG. 19 by reviewing the pulses detected by the receiver 15 which was requested to dwell at the RF frequency of the threat signal and sorting from this dwell of pulses all of the beams having a cycle time substantially equal to the cycle time of the threat signal. If the pulses of any of these beams are substantially one cycle time apart, then the tracker is not predicting all the beams of the signal which is being detected at the RF frequency and it is presumed that a substituted signal has replaced the threat signal originally tracked. Where beams having the same cycle time are found, it is determined that the tracker is not tracking correctly and the tracker is restarted at step 528 of FIG. 19. The operation of the central processing unit then proceeds to step 516. Where no beams having the same cycle time are found, the tracker is considered to be tracking correctly at step 524, and the time is set for the next tracker verification at step 526 before the central processing unit returns to the executive program at step 516. Accordingly, step 524 provides a means for sorting beams from the detected pulses other than the pulses corresponding to the pulses of the particular threat signal detected in response to the control of said tracker; and means for comparing the cycle time of beams sorted by said sorting means with the cycle time of the particular threat signal detected by said detecting means in response to the control of said tracker to determine whether said detecting means has continuously maintained track of a particular threat signal.

We claim:

1. A radar system for detecting threats that transmit microwave beams, said system comprising:
   means for detecting the incidence of microwave signals at a location in space; and
   means for detecting threats from the detected signals, said threat detecting means being operative to compare the detected signals with adaptively redefined stored beams that are associated with stored threats to detect beams transmitted by the threat, said threat detecting means being further operative to detect threats corresponding to the stored threats associated with the adaptively redefined stored beams that are comparable to the detected signals.

2. The radar system of claim 1 further comprising:
   means for predicting the incidence of microwave signals, said predicting means being responsive to the detected threat signals of said threat detecting means to control the signals detected by said signal detecting means.

3. A radar system for adaptively detecting threats that transmit microwave beams, where the parameters of the microwave beams are varied by the threat, said system comprising:
   means for detecting the incidence of microwave signals at a location in space; and means for detecting threat signals from the detected signals, said threat detecting means being operative to compare the detected signals with stored beams that are associated with stored threats to detect beams transmitted by the threat, said threat detecting means also being operative to detect threats corresponding to the stored threats associated with the stored beams that are comparable to the detected signals, said threat detecting means being further operative to adaptively redefine the parameters of the stored beams in response to the corresponding parameters of the detected beams.

4. The radar system of claim 3 further comprising:
means for predicting the incidence of microwave signals, said predicting means being responsive to the detected threat signals of said threat detecting means to control said signal detecting means such that said signal detecting means tracks the detected threat signal.

* * * * *